(12) United States Patent
Lethellier et al.

(10) Patent No.: US 10,826,329 B2
(45) Date of Patent: Nov. 3, 2020

(54) WIRELESS POWER TRANSFER PAD WITH MULTIPLE WINDINGS AND MAGNETIC PATHWAY BETWEEN WINDINGS

(71) Applicant: Wireless Advanced Vehicle Electrification, Inc., Salt Lake City, UT (US)

(72) Inventors: Patrice Lethellier, Herriman, UT (US); Marcellus Harper, Kaysville, UT (US)

(73) Assignee: Wireless Advanced Vehicle Electrification, Inc., Salt Lake City, UT (US)

( * ) Notice: Subject to any disclaimer, the term of this patent is extended or adjusted under 35 U.S.C. 154(b) by 94 days.

(21) Appl. No.: 16/231,742

(22) Filed: Dec. 24, 2018

(65) Prior Publication Data

US 2019/0199134 A1    Jun. 27, 2019

Related U.S. Application Data

(60) Provisional application No. 62/609,947, filed on Dec. 22, 2017.

(51) Int. Cl.
*H02J 50/12*    (2016.01)
*H02J 50/40*    (2016.01)
(Continued)

(52) U.S. Cl.
CPC ............ *H02J 50/12* (2016.02); *H01F 27/255* (2013.01); *H01F 27/306* (2013.01); *H01F 27/36* (2013.01);
(Continued)

(58) Field of Classification Search
CPC .. H02J 50/12; H02J 7/025; H02J 50/40; H02J 2310/48; H01F 38/14; H01F 27/36;
(Continued)

(56) References Cited

U.S. PATENT DOCUMENTS 8,810,071 B2 *   8/2014   Sauerlaender .......... H02J 5/005
                                                                    307/104
10,530,193 B2 *  1/2020   Stephenson ............ H02J 50/40
(Continued)

FOREIGN PATENT DOCUMENTS

CN        102870338        1/2013
CN        103119669        5/2013
(Continued)

OTHER PUBLICATIONS

International Application No. PCT/US 2018/067456, "Notification of Transmittal of International Search Report", dated Apr. 4, 2019, pp. 1-9.

*Primary Examiner* — Jared Fureman
*Assistant Examiner* — Michael J Warmflash
(74) *Attorney, Agent, or Firm* — Kunzler Bean & Adamson; Bruce R. Needham

(57) ABSTRACT

A wireless power transfer ("WPT") pad apparatus includes a ferrite structure and four windings adjacent to the ferrite structure. A horizontal surface of the ferrite structure is adjacent to each of the four windings and each of the four windings are wound in a horizontal pattern that is planar to the horizontal surface. The four windings are arranged in a two-by-two square pattern in a north-south-north-south polarity arrangement.

20 Claims, 14 Drawing Sheets

(51) Int. Cl.
*H01F 27/30* (2006.01)
*H02J 7/02* (2016.01)
*H01F 38/14* (2006.01)
*H01F 27/36* (2006.01)
*H04B 5/00* (2006.01)
*H01F 27/255* (2006.01)

(52) U.S. Cl.
CPC .............. *H01F 38/14* (2013.01); *H02J 7/025* (2013.01); *H02J 50/40* (2016.02); *H04B 5/0037* (2013.01)

(58) Field of Classification Search
CPC ... H01F 27/255; H01F 27/306; H04B 5/0037; H04B 5/0081
See application file for complete search history.

(56) References Cited

U.S. PATENT DOCUMENTS

| | | | |
|---|---|---|---|
| 2012/0235504 A1 | 9/2012 | Kesler | |
| 2017/0287626 A1 | 10/2017 | Larson et al. | |
| 2018/0131239 A1* | 5/2018 | Stephenson | H05K 7/2039 |

FOREIGN PATENT DOCUMENTS

| | | | |
|---|---|---|---|
| EP | 2263296 | B1 | 11/2015 |
| EP | 2819272 | B1 | 12/2017 |
| WO | 2008140333 | A3 | 1/2009 |
| WO | 2013091875 | A2 | 6/2013 |
| WO | 2014038107 | | 3/2014 |

* cited by examiner

WIRELESS POWER TRANSFER PAD WITH MULTIPLE WINDINGS AND MAGNETIC PATHWAY BETWEEN WINDINGS

CROSS-REFERENCES TO RELATED APPLICATIONS

This application claims the benefit of U.S. Provisional Patent Application No. 62/609,947 entitled "WIRELESS POWER TRANSFER PAD WITH MULTIPLE WINDINGS AND MAGNETIC PATHWAY BETWEEN WINDINGS" and filed on Dec. 22, 2017 for Patrice Lethellier et al., which is incorporated herein by reference.

FIELD

This invention relates to wireless power transfer and more particularly relates to a wireless power transfer pad with multiple windings and a magnetic pathway between windings.

BACKGROUND

As wireless power transfer ("WPT") technology increases, there is a need to increase the amount of power transferred wirelessly. Practical size and power limits of components and switching devices limit the amount of power that can be transferred without paralleling devices, such as resonant converters. However, paralleling can cause unequal sharing between devices, which can cause unequal wear and component failure.

SUMMARY

A wireless power transfer ("WPT") pad apparatus includes a ferrite structure and four windings adjacent to the ferrite structure. A horizontal surface of the ferrite structure is adjacent to each of the four windings and each of the four windings are wound in a horizontal pattern that is planar to the horizontal surface. The four windings are arranged in a two-by-two square pattern in a north-south-north-south polarity arrangement.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
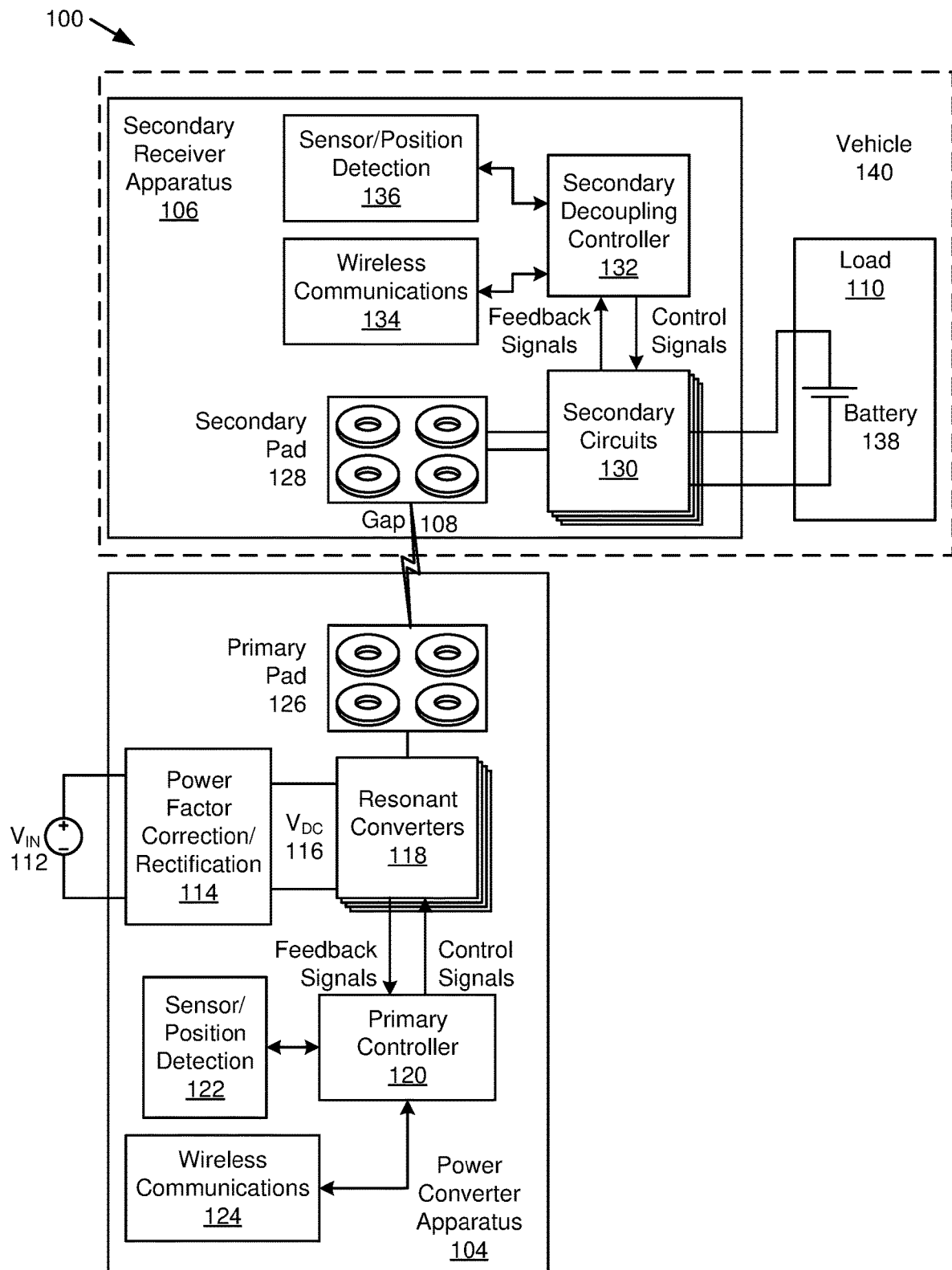
FIG. 1 is a schematic block diagram illustrating one embodiment of a system with a low voltage wireless power transfer ("WPT") pad.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

A wireless power transfer ("WPT") pad apparatus includes a ferrite structure and four windings adjacent to the ferrite structure. A horizontal surface of the ferrite structure is adjacent to each of the four windings and each of the four windings are wound in a horizontal pattern that is planar to the horizontal surface. The four windings are arranged in a two-by-two square pattern in a north-south-north-south polarity arrangement.

In some embodiments, for adjacent windings of the four windings the ferrite structure comprises a magnetic pathway. In other embodiments, a ferrite pathway between adjacent windings of the four windings has a thickness and a width to provide a low impedance, unsaturated magnetic pathway for an electromagnetic field generated by the adjacent windings. In other embodiments, the ferrite structure includes an opening in a center section where the center section is located at a center of the two-by-two square pattern and the center section is external to each of the four windings.

In some embodiments, the WPT pad apparatus includes a vertical shield external to the ferrite structure positioned to shunt an electromagnetic field radiating in a direction horizontal with the horizontal surface of the ferrite structure. In other embodiments, the vertical shield includes a metallic structure oriented transverse to the horizontal surface of the ferrite structure. In other embodiments, the vertical shield has a width where the width is measured in a direction transverse to the horizontal surface of the ferrite structure. The width includes at least a thickness of an edge of the ferrite structure and a thickness of the winding. In other embodiments, the vertical shield includes an opening at each corner of the ferrite structure.

In some embodiments, the horizontal surface includes a first horizontal surface and the WPT pad apparatus also includes a horizontal shield positioned on a second horizontal surface of the ferrite structure. The second horizontal surface is distal to the first horizontal surface and planar with the first horizontal surface. In other embodiments, the horizontal shield includes metallic plate and the horizontal shield reduces a strength of an electromagnetic field generated by the four windings and radiating through the horizontal shield to below a specified limit. In other embodiments, the ferrite structure is thermally coupled to the horizontal shield where heat generated in each of the four windings and in the ferrite structure is transmitted to the horizontal shield. In other embodiments, the WPT pad apparatus includes a vertical shield external to the ferrite structure. The vertical shield is coupled to the horizontal shield and extending in a direction transverse to the horizontal shield in a direction of the ferrite structure and the four windings.

In some embodiments, each of the four windings includes a spiral pattern starting at an edge of a winding center section and expanding away from the center section. The center section has an area without conductors at a center of a winding. In other embodiments, each winding of the four windings includes two or more winding sections wound in parallel and each winding section is connected to a capacitor located at the center section of the winding. In other embodiments, the center section of each winding includes a ferrite chimney coupled to the horizontal surface of the ferrite structure and extending in a direction transverse to the horizontal surface at least a thickness of the winding associated with the center section.

In some embodiments, each of the four windings includes a conductor where each conductor has multiple strands. The strands are electrically isolated from each other and the conductor has a wide side and a narrow side. The wide side of the conductor is oriented transverse to the horizontal surface. In other embodiments, the conductor is a litz wire.

Another WPT pad apparatus includes a ferrite structure and four windings adjacent to the ferrite structure. A horizontal surface of the ferrite structure is adjacent to each of the four windings. Each of the four windings is wound in a horizontal pattern that is planar to the horizontal surface. The four windings are arranged in a two-by-two square pattern in a north-south-north-south polarity arrangement, and for adjacent windings of the four windings, the ferrite structure has a magnetic pathway. A ferrite pathway between adjacent windings of the four windings has a thickness and a width to provide a low impedance, unsaturated magnetic pathway for an electromagnetic field generated by the adjacent windings. The ferrite structure includes an opening in a center section where the center section is located at a center of the two-by-two square pattern and the center section is external to each of the four windings.

In some embodiments, the WPT pad apparatus includes a vertical shield external to the ferrite structure positioned to shunt an electromagnetic field radiating in a direction horizontal with the horizontal surface of the ferrite structure. In other embodiments, the WPT pad apparatus includes a ferrite chimney coupled to the horizontal surface of the ferrite structure in the center section of each winding and extending in a direction transverse to the horizontal surface at least a thickness of the winding associated with the center section.

A WPT system includes a first stage with a resonant converter or an alternating current ("AC") to direct current ("DC") converter. The first stage is configured to wirelessly transmit power to a second stage on a vehicle. The WPT system includes a WPT pad apparatus that receives power from the first stage and transmits power wirelessly to a secondary pad of the second stage. The WPT pad apparatus includes a ferrite structure and four windings adjacent to the ferrite structure. A horizontal surface of the ferrite structure is adjacent to each of the four windings, and each of the four windings is wound in a horizontal pattern that is planar to the horizontal surface. The four windings are arranged in a two-by-two square pattern in a north-south-north-south polarity arrangement.

Another WPT pad apparatus includes a ferrite structure with a horizontal surface and a winding with a conductor. The conductor has a long side and a narrow side. The long side is oriented transverse to the horizontal surface of the ferrite structure and the narrow side is planar with the horizontal surface. The conductor of the winding is wound in a spiral-type configuration.

In some embodiments, the conductor has a rectangular shape and has two parallel long side and two parallel narrow sides. In other embodiments, the conductor has multiple strands where the strands are electrically isolated from each other. In other embodiments, the WPT pad apparatus includes a winding with one or more winding guides. The winding guides maintain the conductor in a winding pattern. In other embodiments, the winding guides maintain spacing between each turn of the winding. In other embodiments, the winding structure includes posts and/or channels that maintain the conductor in a winding pattern.

A method for constructing a fractional winding for wireless power transfer includes providing a ferrite structure with a planar surface and winding a conductor in a planar arrangement in a spiral-type pattern about a center point. The conductors are arranged to be adjacent to the planar surface of the ferrite structure. The winding has a starting point and each turn of the winding is adjacent to the planar surface of the ferrite structure. The winding includes a fractional number of turns where the starting point is at a different angle from a radial line extending radially from the center point than angle of an ending point of the winding measured from the radial line.

In some embodiments, a length of the conductor relates to an amount of inductance of the winding and the method includes determining a target amount of winding inductance and selecting the fractional number of turns based on the target amount of inductance for the winding. In some embodiments, the inductance of the winding is further related to a diameter of the spiral-type pattern of the winding and the method includes determining a diameter of the spiral-type pattern along with selecting the fractional number of turns based on the target amount of inductance of the winding. In other embodiments, the conductors are wound within a winding structure with channels and/or posts that maintain the winding in a particular shape and spacing. The channels are distributed around the center point at various distances from the center point to provide for various diameters of the spiral-type pattern and the winding structure has a plurality of gaps between the channels and/or posts arranged to provide pathways to a center section of the winding for a fractional number of turns. In other embodiments, the method includes covering the conductors within the winding structure with a position maintaining material that maintains the winding in a selected spiral-type pattern with a fractional number of turns, and placing the winding structure with the conductors adjacent to the ferrite structure, where the conductors are adjacent to the planar surface of the ferrite structure.

A WPT pad includes a horizontal shield, a ferrite structure mounted to the horizontal shield, where the ferrite structure has a planar surface distal to a surface of the ferrite structure mounted to the horizontal shield, and a winding with a conductor in a planar arrangement in a spiral-type pattern about a center point, where the winding has a center section with the center point within the center section. The WPT pad includes a capacitor located within the center section of the winding, a winding insulator located between conductors of the winding and the ferrite structure, where the winding insulator is electrically insulating the conductors from the ferrites structure, and a capacitor insulator located adjacent to the capacitor on a side of the capacitor facing the horizontal shield. The capacitor insulator includes a material that electrically insulates the capacitor from the ferrite structure and/or the horizontal shield. The capacitor insulator transmits heat from the capacitor to one or more of the horizontal shield and the ferrite structure.

In some embodiments, the capacitor insulator includes a ceramic printed circuit board ("PCB") material. In other embodiments, the capacitor insulator includes aluminum nitride. In other embodiments, the winding insulator includes a glass-reinforced epoxy laminate. In other embodiments, the winding insulator has a National Electrical Manufacturers Association ("NEMA") flame retardant ("FR") rating of 4 ("FR 4"). In other embodiments, the capacitor is secured to the horizontal shield with a fastener and the fastener is electrically insulated from the capacitor with a connector insulator.

In some embodiments, the ferrite structure has a horizontal shield with the planar surface and a ferrite chimney. The ferrite chimney is located in the center section and is adjacent to the winding. The ferrite chimney extends in a direction away from the planar surface of the ferrite structure to at least a distance of a thickness of the conductors or twice a thickness of the horizontal shield. The thickness is measured in a direction transverse to the planar surface. The ferrite chimney is thermally and electrically coupled to the horizontal shield of the ferrite structure. In other embodiments, the WPT pad includes a winding structure that separates turns of the winding a specified distance. The winding structure is electrically insulating turns of the winding from each other and maintaining the conductors of the winding in the spiral-type pattern.

A winding structure for a WPT pad includes a base with an insulating material and channels within the base and/or one or more posts extending from the base to a height of a top of the channels. The channels and posts are configured to maintain one or more conductors of a winding in a particular shape and spacing. The channels are distributed around a center point of the winding at various distances from the center point to provide for various diameters of a spiral-type pattern, and the winding structure includes a plurality of gaps between the one or more channels and/or the one or more posts. The plurality of gaps are arranged to provide pathways to a center section of the winding.

In some embodiments, the winding structure includes a capacitor opening. The capacitor opening is sized for one or more capacitors. In other embodiments, the capacitor opening is located in the center section. In other embodiments, the winding structure includes one or more ferrite openings. Each ferrite opening is sized for a ferrite chimney. At least one ferrite opening is located in the center section at an outer perimeter of the center section and adjacent to the one or more conductors of the winding. In other embodiments, the winding structure includes one or more terminal slots and a terminal within each terminal slot. One or more conductors of the winding each terminate on a terminal within a terminal slot. The terminal slots have a length longer than a terminal and the terminal of a terminal slot is movable within the terminal slot of the terminal along the length of the terminal slot.

In some embodiments, the winding structure includes a position maintaining material placed around components within the winding structure where the position maintaining material is placed around the components once a configuration of the components is set. In other embodiments, the position maintaining material is an epoxy resin. In other embodiments, the winding structure includes nylon.

Another WPT pad includes a ferrite structure, a first winding adjacent to the ferrite structure, where the first winding is arranged in a spiral-type pattern, and a second winding adjacent to the ferrite structure. The second winding is arranged in a spiral-type pattern and the second winding is wound parallel to the first winding. The first and second windings are arranged to compensate for a difference in length between the first winding and the second winding for portions of the first and second windings wound adjacent to each other.

In some embodiments, starting points of the first and second windings are at an exterior of the first and second windings and the starting point of the second winding is before the starting point of the first winding and an ending point of the second winding is after an ending point of the first winding. In other embodiments, a length of the second winding is equal to a length of the first winding. In other embodiments, the starting point of the first winding is positioned so a conductor connected to the ending point of the second winding and traversing the first and second windings to the starting point of the first winding traverses perpendicular to the first and second windings to reach the starting point of the first winding, and the starting point of the second winding is positioned so a conductor connected to the ending point of the second winding and traversing the first and second windings to the starting point of the second winding traverses perpendicular to the first and second windings to reach the starting point of the second winding.

In some embodiments, the first winding includes a first conductor and a fourth conductor and the second winding includes a second conductor and a third conductor. The first conductor is an outermost conductor and is adjacent to the second conductor, the second conductor is adjacent to the third conductor, and the third conductor is adjacent to the fourth conductor is an innermost conductor. In other embodiments, ending points of the first, second, third and fourth conductors are at a center section of the first and second windings and a starting point of the first, second, third and fourth conductors are at an exterior of the first and second windings. The ending point of the first conductor is connected to the starting point of the fourth conductor and the ending point of the second conductor is connected to the starting point of the third conductor. In other embodiments, ending points of the first, second, third and fourth conductors are at a center section of the first and second windings and a starting point of the first, second, third and fourth conductors are at an exterior of the first and second windings. The ending point of the first conductor is connected to a first terminal of a first capacitor and a second terminal of the first capacitor is connected to the starting point of the fourth conductor. The ending point of the second conductor is connected to a first terminal of a second capacitor and a second terminal of the second capacitor is connected to the starting point of the third conductor.

FIG. 1 is a schematic block diagram illustrating one embodiment of a WPT system 100 with a low voltage WPT pad. The WPT system 100 includes a power converter apparatus 104 and a secondary receiver apparatus 106 separated by a gap 108, and a load 110, which are described below.

The WPT system 100 includes a power converter apparatus 104 that receives power from a power source 112 and transmits power over a gap 108 to a secondary receiver apparatus 106, which transfers power to a load 110. The power converter apparatus 104, in one embodiment, may be called a switching power converter and includes a resonant converter 118 that receives a direct current ("DC") voltage from a DC bus 116.

In one embodiment, the power source 112 provides DC power to the DC bus 116. In another embodiment, the power source 112 is an alternating current ("AC") power source, for example from a building power system, from a utility, from a generator, etc. and the power converter apparatus 104 includes a form of rectification to provide DC power to the DC bus 116. For example, the rectification may be in the form of a power factor correction and rectification circuit 114. In the embodiment, the power factor correction and rectification circuit 114 may include an active power factor correction circuit, such as a switching power converter. The power factor correction and rectification circuit 114 may also include a full-bridge, a half-bridge rectifier, or other rectification circuit that may include diodes, capacitors, surge suppression, etc.

The resonant converter 118 may be controlled by a primary controller 120, which may vary parameters within the resonant converter 118, such as conduction time, conduction angle, duty cycle, switching, etc. The primary controller 120 may receive information from sensors and position detection 122 within or associated with the power converter apparatus 104. The primary controller 120 may also receive information wirelessly from the secondary receiver apparatus 106.

The power converter apparatus 104 includes a primary pad 126 (i.e. a primary WPT pad) that receives power from the resonant converter 118. In the depicted embodiment, the primary pad 126 includes four windings, which may also be termed "pads." To support the windings, the power converter apparatus 104 may include multiple resonant converters 118. In one embodiment, portions of the resonant converter 118 and primary pad 126 form a resonant circuit that enables efficient wireless power transfer across the gap 108. In another embodiment, the power converter apparatus 104 includes a switching power converter that is not a resonant converter. The gap 108, in some embodiments includes an air gap, but may also may partially or totally include other substances. For example, where the primary pad 126 is in a roadway, the gap 108 may include a resin, asphalt, concrete or other material just over the windings of the primary pad 126 in addition to air, snow, water, etc. between the primary pad 126 and a secondary pad 128 located in the secondary receiver apparatus 106.

The secondary receiver apparatus 106 includes a secondary pad 128 (i.e. a secondary WPT pad) connected to a secondary circuit 130 that delivers power to the load 110. In the depicted embodiment, the secondary pad 128 may include multiple windings, which may also be termed "pads." Each winding may feed a separate secondary circuit 130. The secondary receiver apparatus 106 may also include a secondary decoupling controller 132 that controls the secondary circuit 130 and may also be in communication with sensors and/or position detection 136 and wireless communications 134 coupled to the power converter apparatus 104.

In one embodiment, the secondary receiver apparatus 106 and load 110 are part of a vehicle 140 that receives power from the power converter apparatus 104. The load 110 may include a battery 138, a motor, a resistive load, a circuit or other electrical load. For example, the WPT system 100 may transfer power to a portable computer, a consumer electronic device, to an industrial load, or other portable load that would benefit from receiving power wirelessly.

In one embodiment, the secondary circuit 130 includes a portion of resonant circuit that interacts with the secondary pad 128 and that is designed to receive power at a resonant frequency. In another embodiment, the secondary circuit 130 includes a power conditioning circuit that is not a resonant circuit. The secondary circuit 130 may also include a rectification circuit, such as a full-bridge rectifier, a half-bridge rectifier, and the like. In another embodiment, the secondary circuit 130 includes a power converter of some type that receives power from the resonant circuit/rectifier and actively controls power to the load 110. For example, the secondary circuit 130 may include a switching power converter. In another embodiment, the secondary circuit 130 includes passive components and power to the load 110 is controlled by adjusting power in the power converter apparatus 104. In another embodiment, the secondary circuit 130 includes an active rectifier circuit that may receive and transmit power. One of skill in the art will recognize other forms of a secondary circuit 130 appropriate for receiving power from the secondary pad 128 and delivering power to the load 110.

The resonant converter 118, in one embodiment, includes an active switching section coupled to a resonant circuit formed with components of the resonant converter 118 and the primary pad 126. The resonant converter 118 is described in more detail with regard to FIGS. 2A and 2B.

Figure 2A:
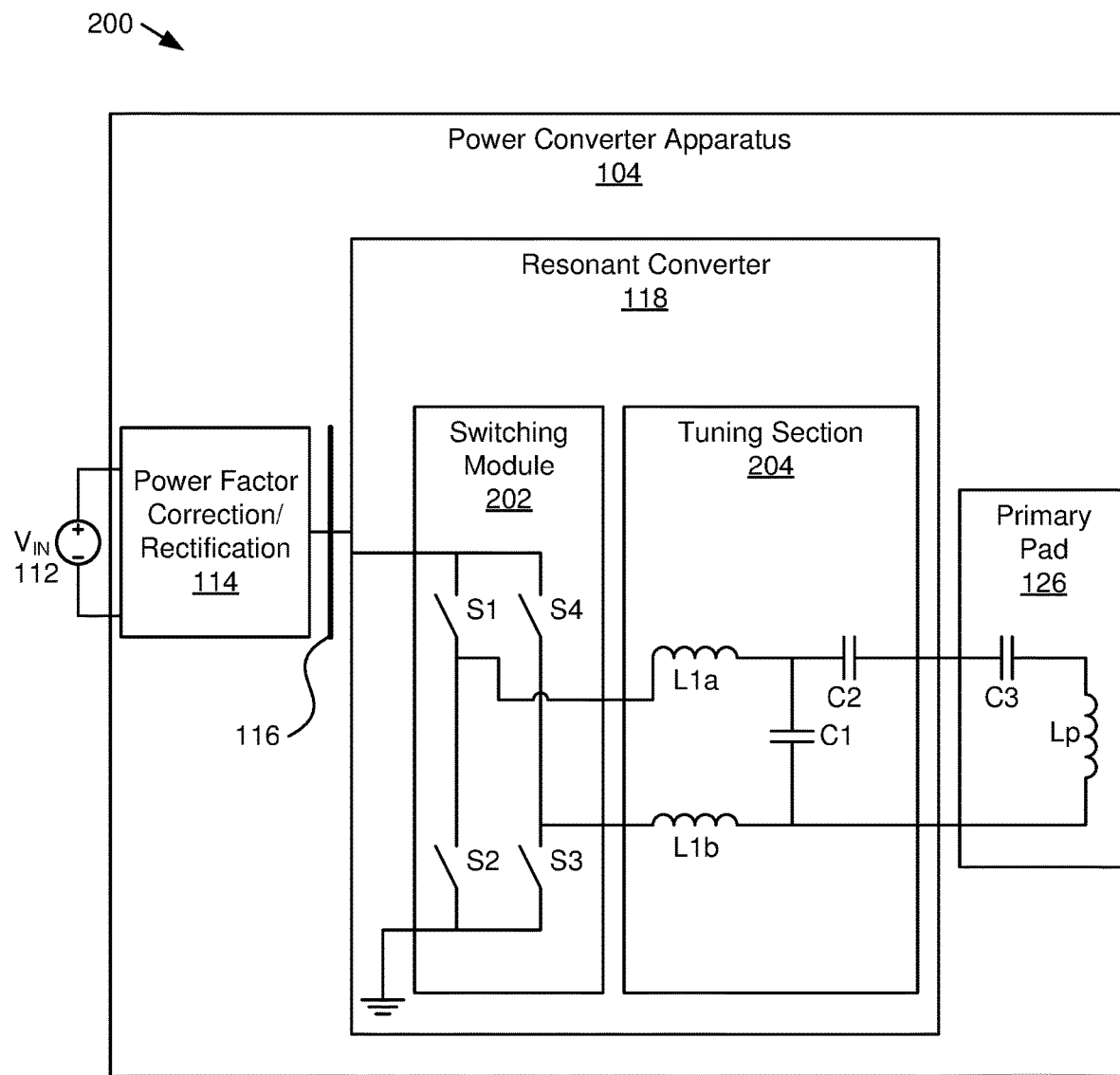
FIG. 2A is a schematic block diagram illustrating one embodiment of a power converter apparatus.

FIG. 2A is a schematic block diagram illustrating one embodiment 200 of a power converter apparatus 104. The power converter apparatus 104 is connected to a power source 112 and includes a power factor correction and rectification circuit 114 connected to a DC bus 116 feeding a resonant converter 118 connected to a primary pad 126 as described with regard to the WPT system 100 of FIG. 1.

The resonant converter 118 includes a switching module 202 and a tuning section 204. In one embodiment, the switching module 202 includes four switches configured to connect the DC bus 116 and to ground. Typically, switches S1 and S3 close while switches S2 and S4 are open and vice-versa. When switches S1 and S3 are closed, the DC bus 116 is connected to a positive connection of the tuning section 204 through inductor L1a and the ground is connected to the negative connection of the tuning section 204 through inductor L1b while switches S2 and S4 are open. When switches S2 and S4 are closed, the ground is connected to the positive terminal of the tuning section 204 and the DC bus 116 is connected to the positive connection of the tuning section 204. Thus, the switching module alternates connection of the DC bus 116 and ground to the tuning section 204 simulating an AC waveform. The AC waveform is typically imperfect due to harmonics.

Typically, switches S1-S4 are semiconductor switches, such as a metal-oxide-semiconductor field-effect transistor ("MOSFET"), a junction gate field-effect transistor ("JFET"), a bipolar junction transistor ("BJT"), an insulated-gate bipolar transistor ("IGBT") or the like. Often the switches S1-S4 include a body diode that conducts when a negative voltage is applied. In some embodiments, the timing of opening and closing switches S1-S4 are varied to achieve various modes of operations, such as zero-voltage switching.

The tuning section 204 of the resonant converter 118 and the primary pad 126 are designed based on a chosen topology. For example, the resonant converter 118 and primary pad 126 may form an inductor-capacitor-inductor ("LCL") load resonant converter, a series resonant converter, a parallel resonant converter, and the like. The embodiment depicted in FIG. 2A includes an LCL load resonant converter.

Resonant converters include an inductance and capacitance that form a resonant frequency. When a switching frequency of the tuning section 204 is at or close to the resonant frequency, voltage with the tuning section 204 and primary pad 126 often increases to voltages levels higher than the voltage of the DC bus 116. For example, if the voltage of the DC bus 116 is 1 kilovolt ("kV"), voltage in the tuning section 204 and resonant converter 118 may be 3 kV or higher. The high voltages require component ratings, insulation ratings, etc. to be high enough for expected voltages.

The primary pad 126 includes capacitor C3 and inductor Lp while the tuning section 204 includes series capacitor C2. Capacitors C2 and C3 add to provide a particular capacitance that forms a resonant frequency with inductor Lp. In some embodiments, the power converter apparatus 104 includes a single series capacitor in the tuning section 204 or in the primary pad 126. While FIG. 2A is focused on the resonant converter 118 and primary pad 126, the secondary receiver apparatus 106 includes a secondary pad 128 and a secondary circuit 130 that typically includes a tuning section 204 where the inductance of the secondary pad 128 and capacitance of the tuning section 204 of the secondary circuit 130 form a resonant frequency and the secondary pad 128 and secondary circuit 130 have voltage issues similar to the primary pad 126 and resonant converter 118. In other embodiments, the tuning section 204 and primary pad 126 are not designed to produce a resonance, but instead condition voltage from the switching module 202. For example, the tuning section 204 may filter out harmonic content without filtering a switching frequency.

Figure 2B:
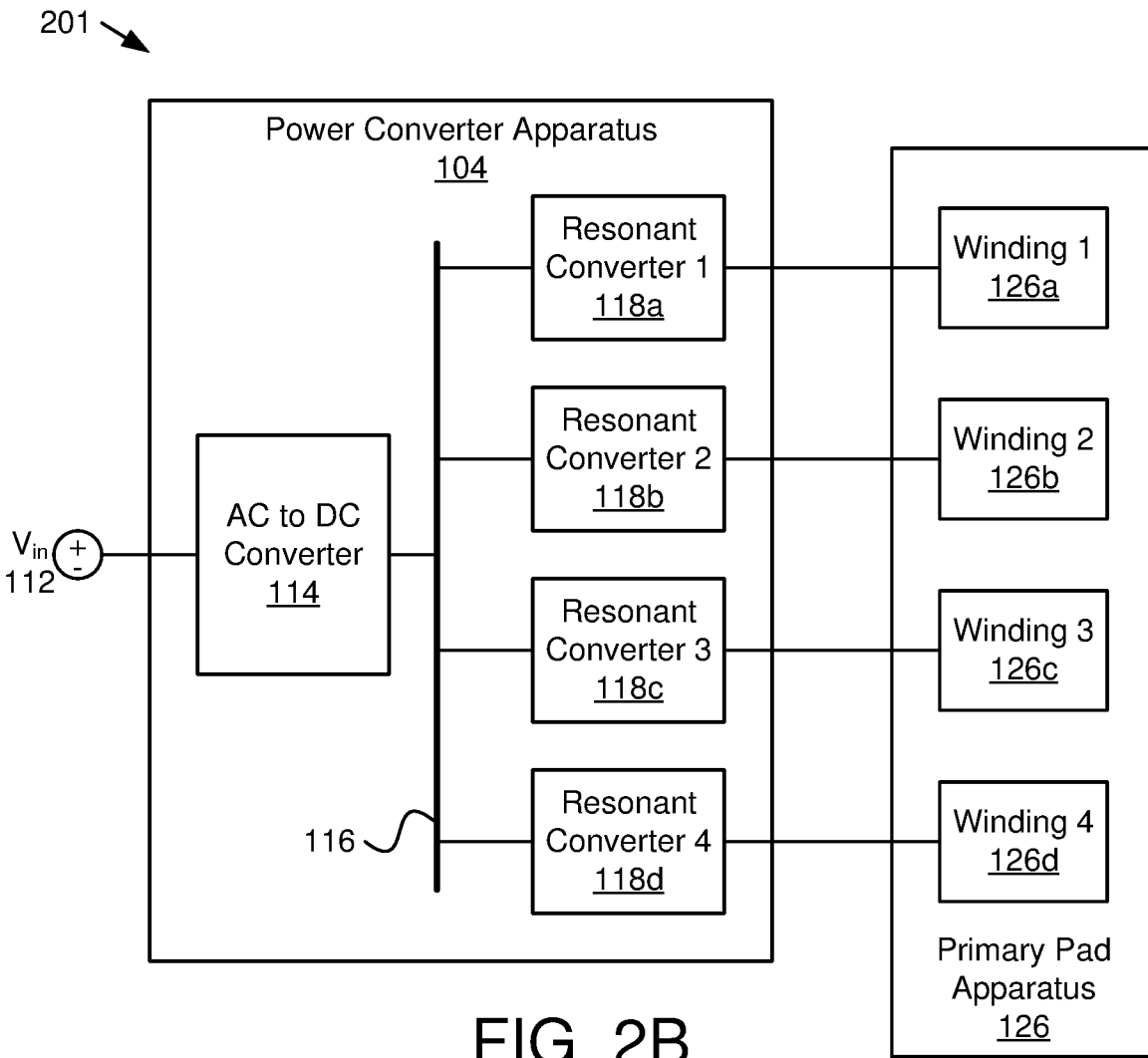
FIG. 2B is a schematic block diagram illustrating one embodiment of a power converter apparatus with multiple resonant converters feeding windings of one or more WPT pads and/or windings.

FIG. 2B is a schematic block diagram illustrating one embodiment 201 of a power converter apparatus 104 with multiple resonant converters 118a-d feeding windings 126a-d of one or more primary pads 126. FIG. 2B is presented in a one-line diagram format. One of skill in the art will recognize that each line between elements represents two or more conductors. The power source 112, power factor correction and rectification circuit 114 and DC bus 116 are substantially similar to those described in the embodiment 200 of FIG. 2A. The power converter apparatus 104 includes four resonant converters 118a-d (generically or individually "118") where each resonant converter 118 includes a switching module 202 and may include a tuning section 204. Each resonant converter 118 feed a winding (e.g. 126a) of a primary pad 126, which may include multiple windings 126a-d. A resonant converter (e.g. 118a) may feed an individual primary pad 126.

Figure 3A:
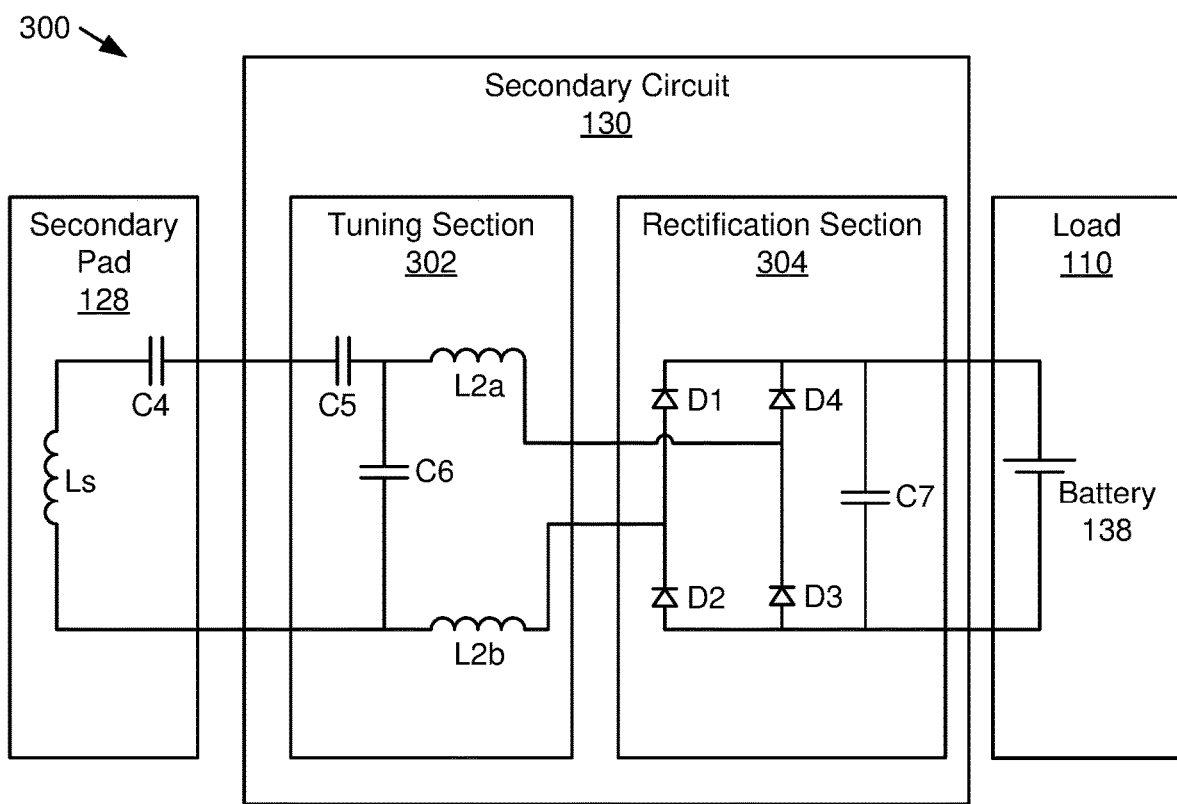
FIG. 3A is a schematic block diagram illustrating one embodiment of a secondary circuit feeding a load.

FIG. 3A is a schematic block diagram illustrating one embodiment 300 of a secondary circuit 130 feeding a load 110. A secondary pad 128 feeds a tuning section 302 within the secondary circuit 130 and the tuning section 302 feeds a rectification section 304 in the secondary circuit 130, which feeds a load 110.

The secondary pad 128 includes one or more windings arranged to receive power from a primary pad 126. The secondary pad 128 may include a ferrite structure and windings arranged in a pattern that efficiently receives power from the primary pad 126. In one embodiment, the secondary pad 128 mirrors the primary pad 126 transmitting power. In another embodiment, the secondary pad 128 differs from the primary pad 126. Typically, the secondary pad 128 includes an inductance Ls formed as a result of the windings and the ferrite structure of the secondary pad 128. In one embodiment, the secondary pad 128 includes a capacitor C4.

The tuning section 302 includes one or more capacitors C5, C6 and inductors L2a, L2b that are arranged to form a resonant circuit with the secondary pad 128 with a resonant frequency. In some embodiments, capacitor C6 is not present. In one embodiment, the resonant frequency matches a resonant frequency of the primary pad 126 transmitting power. Typically, a resonant frequency is formed between the inductor Ls of the secondary pad 128 and series capacitors C4 and C5 of the secondary pad 128 and/or tuning section 302. In some embodiments, the secondary pad 128 or the tuning section 302 include a single series capacitor C4 or C5. Other capacitors (e.g. C6) and inductors (e.g. L2a, L2b) may form a low pass filter to reduce voltage ripple at the resonant frequency. In other embodiments, a low-pass filter is included after rectification elements in the rectification section 304. For example, a capacitor C7 may be included. One of skill in the art will recognize other configurations of the tuning section 302 that form a resonant tank with the secondary pad 128 and pass energy to the rectification section 304 or another suitable circuit.

A rectification section 304 includes diodes, switches, or other rectification elements to convert alternating current ("AC") power to direct current ("DC") power. The rectification section 304 depicted in FIG. 3 includes a full bridge rectifier with four diodes D1-D4. In some embodiments, the diodes D1-D4 are replaced with active elements, such as switches, which may be used to reduce harmonics, reduce power consumption, and the like. For example, the rectification section 304 may include a switching power converter that controls an output voltage to the load 110.

The load 110, in one embodiment is a battery 138. In other embodiments, the load 110 may include other components, such as a motor, a resistive load, electronics, and the like. In one embodiment, the secondary pad 128, secondary circuit 130 and load 110 are part of a vehicle 140. In other embodiments, the secondary pad 128, secondary circuit 130 and load 110 are part of a computing device, a smartphone, and the like.

Figure 3B:
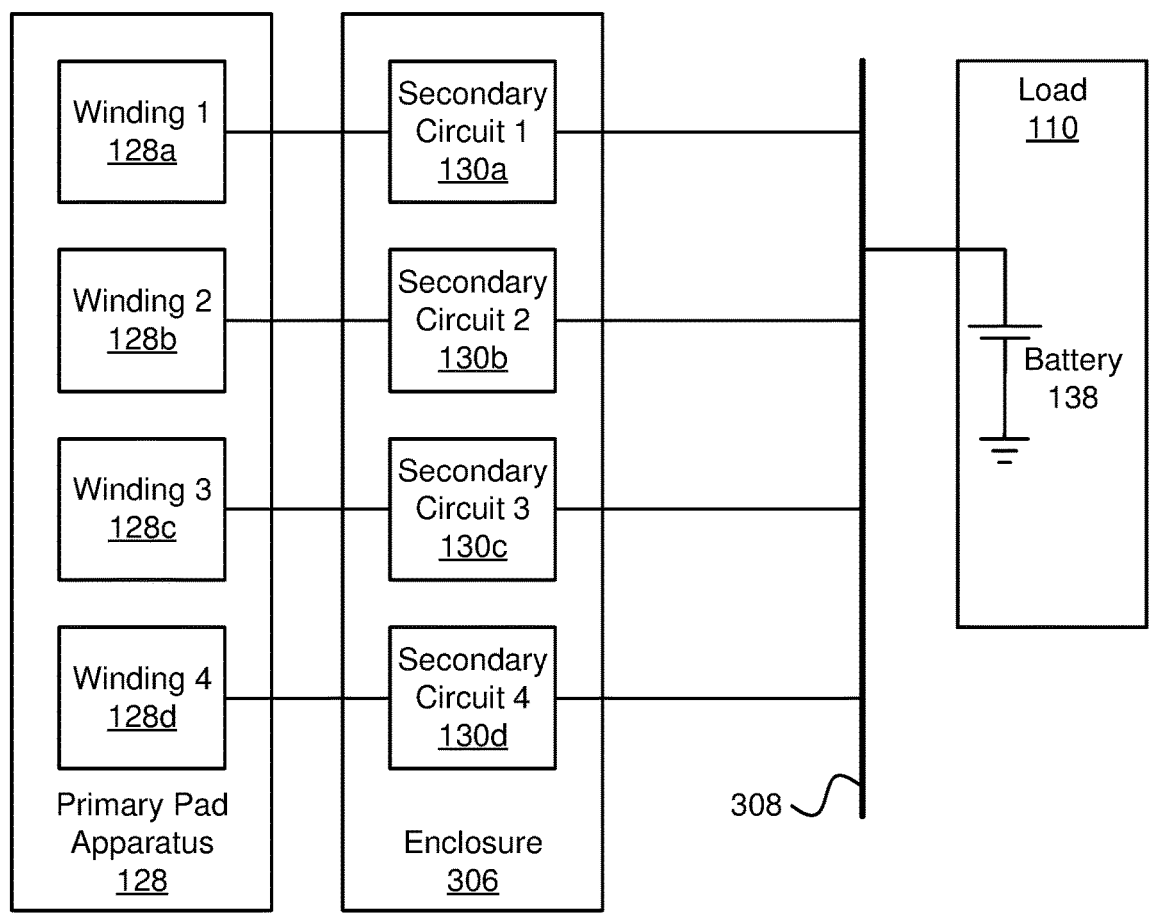
FIG. 3B is a schematic block diagram illustrating one embodiment of several windings of a secondary pad feeding several secondary circuits, which feed a load.

FIG. 3B is a schematic block diagram illustrating one embodiment 301 of several windings 128a-d of a secondary pad 128 feeding several secondary circuits 130a-d, which feed a load 110. The secondary circuits 130a-d, in one embodiment, are in an enclosure 306 and feed a secondary DC bus 308, which feeds the load 110. A secondary pad 128 with multiple windings 128a-d is advantageous to increase a power level and multiple windings 128a-d may also be used in determining alignment. Multi-winding pads 126, 126 are discussed in more detail below.

Figure 4:
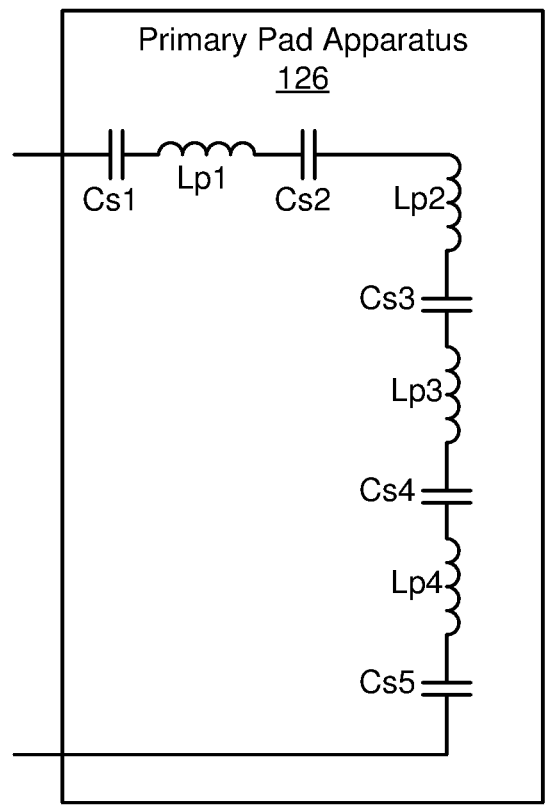
FIG. 4 is a schematic block diagram illustrating one embodiment of a low voltage WPT pad.

FIG. 4 is a schematic block diagram illustrating one embodiment of a low voltage WPT pad. In the embodiment, the capacitance Cs has been distributed in five capacitors, Cs1, Cs2, Cs3, Cs4 and Cs5. The winding of the primary pad 126, which forms an inductance, is divided into four sections, Lp1, Lp2, Lp3, Lp4. The capacitors Cs2, Cs3, Cs4 and Cs5 are distributed between winding sections as depicted. While five capacitors and four winding sections are depicted, one of skill in the art will recognize that other numbers of capacitors and winding sections may be used. In addition, the low voltage WPT pad may be for a primary or a secondary pad.

Figure 5:
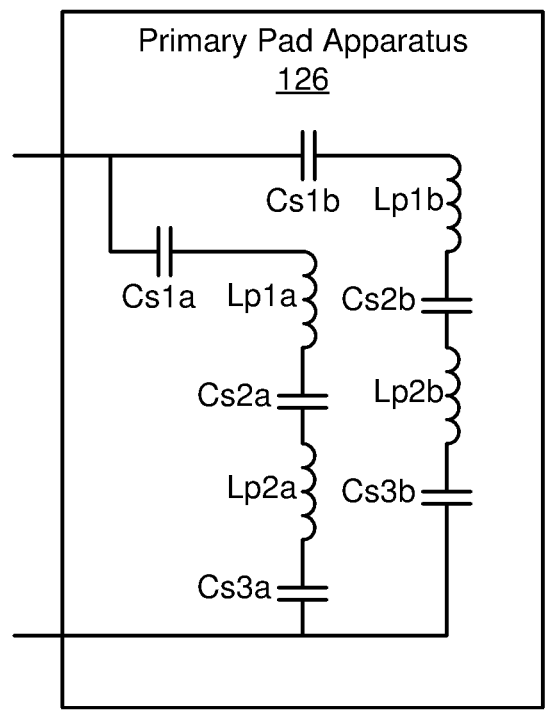
FIG. 5 is a schematic block diagram illustrating one embodiment of a low voltage WPT pad with two parallel windings.

FIG. 5 is a schematic block diagram illustrating one embodiment of a low voltage WPT pad with two parallel windings. In the embodiment, the capacitance Cs has been distributed in two parallel windings. A first winding includes three capacitors, Cs1a, Cs2a, and Cs3a. The first winding of the primary pad 126, which forms an inductance, is divided into two sections, Lp1a and Lp2a. In the first winding, capacitors Cs1a, Cs2a and Cs3a are distributed between winding sections as depicted. A second parallel winding includes three capacitors, Cs1b, Cs2b, and Cs3b. The second winding of the primary pad 126, which forms an inductance, is divided into two sections, Lp1b and Lp2b. In the second winding, capacitors Cs1b, Cs2b and Cs3b are distributed between winding sections as depicted. While six capacitors and four winding sections are depicted, one of skill in the art will recognize that other numbers of capacitors and winding sections may be used. In addition, while the windings are depicted connected in parallel, in other embodiments each winding may be fed by a separate resonant converter 118. In another embodiment, the windings are connected in series. The low voltage WPT pad may be for a primary or a secondary pad.

Figure 6:
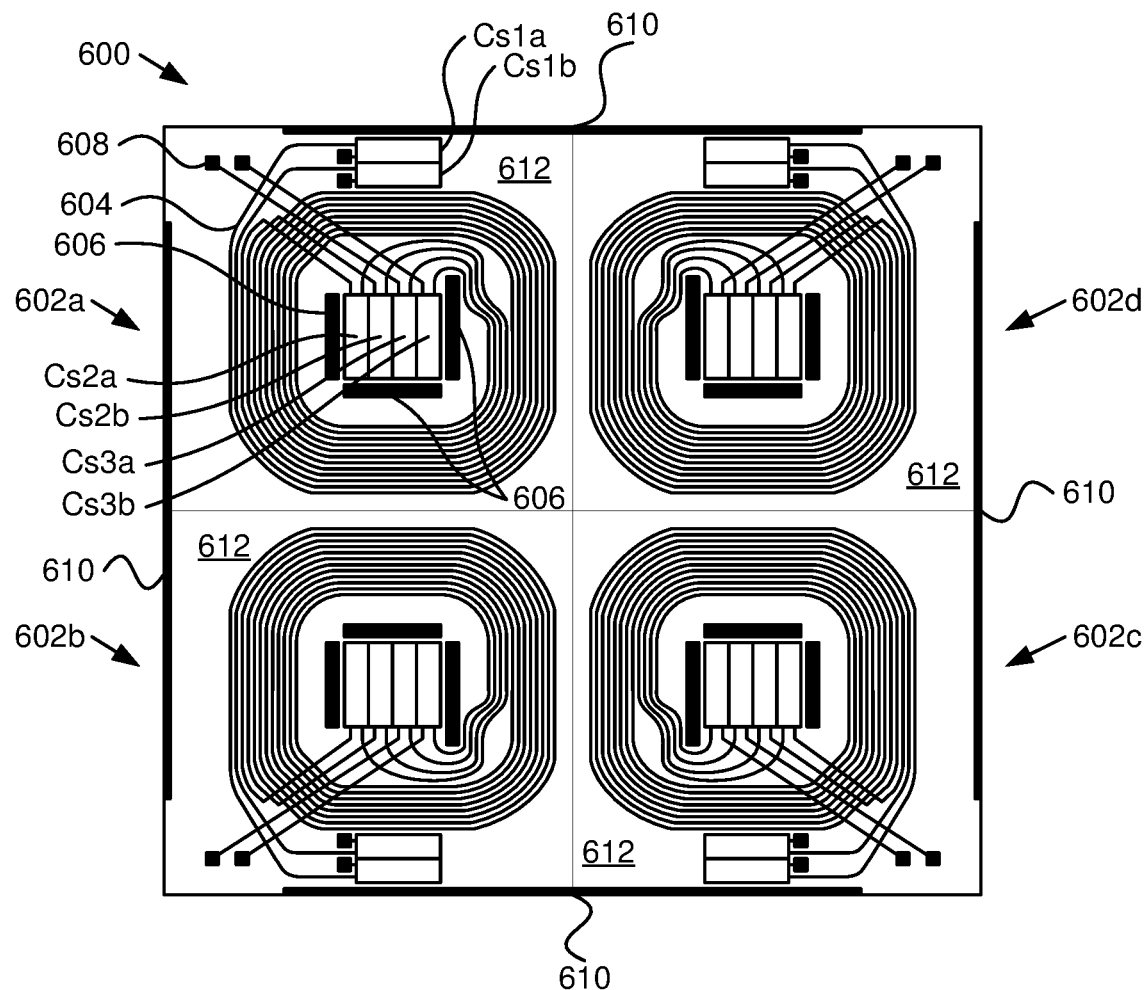
FIG. 6 is a schematic block diagram illustrating one embodiment of a WPT pad with four windings with a ferrite structure removed.

FIG. 6 is a schematic block diagram illustrating one embodiment 600 of a WPT pad 126, 128 with four windings 602a, 602b, 602c, 602d (generically or collectively "602") with a ferrite structure removed. Each winding 602 is configured similar to the windings depicted in FIG. 5 with capacitors Cs1a, Cs2a and Cs3a on one winding and Cs1b, Cs2b and Cs3b on the other winding, but other configurations are also contemplated, such as the embodiment 400 of FIG. 4, windings 602 without intervening capacitors, etc. and the ferrite structure, vertical shields, horizontal shields, four windings 602 in a two-by-two pattern, etc. described below are applicable to the various winding configurations. The conductors 604 in the windings 602 are depicted as lines where the inductances (i.e. Ls1a) are not called out specifically. Each winding 602 includes a ferrite chimney 606, which is a ferrite section adjacent to the conductors 604 of the windings 602. The ferrite chimney 606 is described in more detail with regard to FIG. 8. Connection points 608 are depicted as square boxes. Each winding 60a, 602b, 602c, 602d is configured the same so for clarity only the first winding 602a is labeled.

The four windings 602 are surrounded by vertical shields 610. Each vertical shield 610 is located external to the ferrite structure and is positioned to shunt an electromagnetic field radiating in a direction horizontal with a horizontal surface of the ferrite structure. The vertical shields 610 are described more in relation to FIGS. 7 and 8.

In one embodiment, each of the four windings 602a-d is wound in a spiral pattern starting at an edge of a winding center section and expanding away from the center section. The center section is an area without conductors at a center of a winding (e.g. 602a). In one embodiment, the spiral is an Archimedean spiral. In another embodiment, the spiral is a modified Archimedean spiral that is not purely circular, but includes straight sections or other modifications to accommodate the ferrite chimneys 606, convenience, etc.

Figure 7:
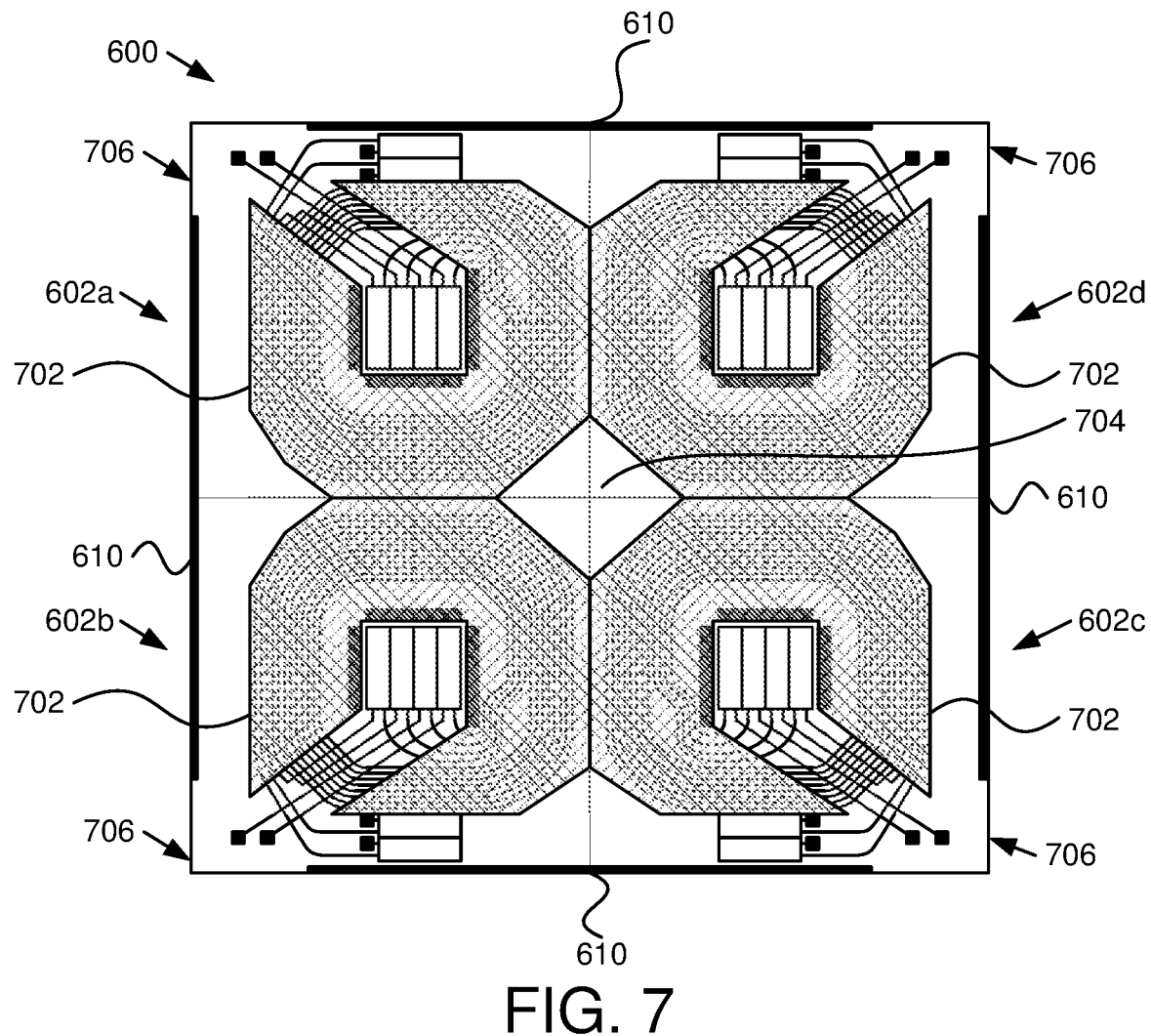
FIG. 7 is a schematic block diagram illustrating one embodiment of a WPT pad with four windings with a ferrite structure included.

FIG. 7 is a schematic block diagram illustrating the embodiment 600 of the WPT pad 126, 128 with four windings 602 with a ferrite structure 702a, 702b, 702c, 702d (generically or collectively "702") included for each winding 602a, 602b, 602c, 602d. The four windings 602a-d are adjacent to the ferrite structure 702, where a horizontal surface of the ferrite structure 702 is adjacent to each of the four windings 602a-d. Each of the four windings 602a-d are wound in a horizontal pattern that is planar to the horizontal surface. The four windings 602a-d are arranged in a two-by-two square pattern in a north-south-north-south polarity arrangement.

The ferrite structure 702a of the first winding 602a is configured to magnetically connect to the ferrite structure 702b, 702d of each adjacent winding 602b, 602d to create a low impedance magnetic pathway between each winding 602. In one embodiment, the ferrite pathway between adjacent windings (e.g. 602a, 602b) of the four windings 602 has a thickness and a width to provide a low impedance, unsaturated magnetic pathway for an electromagnetic field generated by the adjacent windings 602a, 602b. For example, the ferrite structure 702 may be sized for an amount of power wirelessly transferred through the WPT pad 126, 128 to not saturate for an expected electromagnetic field generated by the windings 602.

In one embodiment, the resultant ferrite structure 702 includes four separate ferrite structures 702a-d that are positioned to be adjacent to allow for a low impedance magnetic pathway from one winding (e.g. 602a) to another winding (e.g. 602b). For example, the ferrite structures 702a-d may be touching or are positioned very close to each other. In another embodiment, the ferrite structure 702 is constructed to be a unitary structure. The ferrite structure 702 may be a single piece of ferrite or may be constructed of ferrite blocks or similar ferrite pieces.

In one embodiment, the resultant ferrite structure 702 includes an opening in a center section 704, where the center section 704 is located at a center of the two-by-two square pattern of windings 602 and the center section is external to each of the four windings 602a-d. Typically, having an opening in the center section 704 is more cost effective than ferrite placed in the center section 704. Having ferrite in the center section 704 may provide little benefit compared to a cost of the ferrite. In another embodiment, the center section 704 includes ferrite.

The embodiment 600 includes vertical shields 610 external to the ferrite structure 702 positioned to shunt an electromagnetic field radiating in a direction horizontal with a horizontal surface of the ferrite structure 702. In one embodiment, the vertical shield 610 includes a metallic plate oriented transverse to the horizontal surface of the ferrite structure 702. In another embodiment, the vertical shield 610 has an opening 706 at each corner of the windings 602a-d and/or ferrite structure 702, as depicted. As depicted, the vertical shields 610 may run along only a part of an edge of the windings 602.

External to each winding in FIGS. 6 and 7 is a winding structure 612 that may be used to support the windings, ferrite chimneys 606, connection points 608, etc. In some embodiments, the winding structure 612 is non-magnetic. In some embodiments, the winding structure 612 is rigid and includes channels, ridges, indentations, etc. to support various components of the windings 602. In some embodiments, the winding structure 612 provides insulation between components and has a dielectric breakdown sufficient for voltages anticipated on the primary pad 126 or secondary pad 128. In some embodiments, the winding structure 612 is a rigid material, such as nylon. In one embodiment, an insulating layer (not shown) is placed between the windings 602 and the ferrite structure 702. For example, the insulating layer may meet the FR-4 standard of the National Electrical Manufacturers Association ("NEMA") LI 1-1998 specification, and may be a glass-reinforced epoxy laminate or other similar material.

In one embodiment, the windings 602 each include conductors 604 which include multiple strands. In one embodiment, each strand of a conductor 604 is electrically isolated from other strands within the conductor 604, for example, to minimize skin effect. In some embodiments, the conductors 604 are a litz wire. In other embodiments, the conductors 604 are not litz wire, but are in other configurations. For example, the conductor 604 may include one or more strands of copper or other conductive metal configured to reduce skin effect and may be configured to be pliable. The litz wire, in one embodiment, includes fine strands of conductors and some of the strands may be wound and/or woven together. In one embodiment, the litz wire is rectangular shaped with a wide side and a narrow side. The litz wire may bend more readily in a direction transverse to the wide side. In one embodiment, the wide side of the litz wire is oriented transverse to a horizontal surface of the ferrite structure 702, which may facilitate tighter bends than if the litz wire was oriented with the wide side toward the horizontal surface of the ferrite structure 702. The litz wire, in one embodiment, is placed in channels in the winding structure 612 to maintain a particular pattern, spacing, etc. In another embodiment, the winding structure 612 includes extensions, posts, guides, or the like to facilitate a particular pattern, spacing, etc. of the litz wire.

In one embodiment, the vertical shields 610 are adjacent to and/or connected to a horizontal shield (not shown), which is located adjacent to the ferrite structure 702 where the ferrite structure 702 is between the horizontal shield and the windings 602. In another embodiment, the vertical shield 610 is coupled to the horizontal shield. In another embodiment, the vertical shield 610 is adjacent to the horizontal shield but is not coupled to the horizontal shield. In one embodiment, the horizontal shield extends beyond the ferrite structure 702 and the windings 602 and may be placed between the ferrite structure 702 and a vehicle 140 for a secondary pad 128 or between the ferrite structure 702 and a ground below a primary pad 126. In one embodiment, the horizontal shield is thermally and/or electrically coupled to the ferrite structure 702. The horizontal shield may be a single structure or may be split into multiple horizontal shields, for example a horizontal shield 708 for each winding 602a-d. A horizontal shield that is a single plate may be advantageous to prevent water or another substance from passing beyond the horizontal shield to the ferrite structure 702 and/or windings 602. The horizontal shield is described in more detail with regard to the embodiment 800 of FIG. 8.

Figure 8:
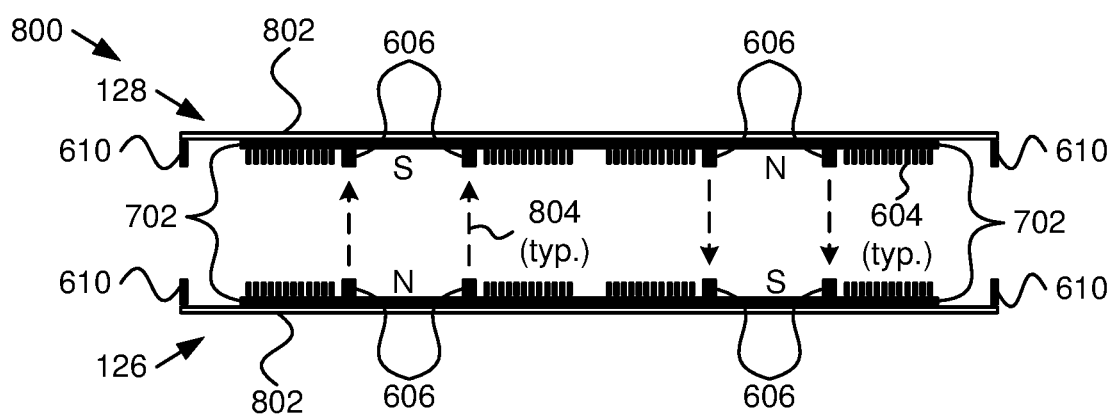
FIG. 8 is a schematic block diagram illustrating one embodiment of a cross section of a primary pad and a secondary pad, each with a ferrite chimney and a vertical shield.

FIG. 8 is a schematic block diagram illustrating one embodiment 800 of a cross section of a primary pad 126 and a secondary pad 128, each with a ferrite chimney 606 and a vertical shield 610. The embodiment 800 is substantially similar to the embodiment 600 depicted in FIGS. 6 and 7.

Each of the primary pad 126 and secondary pad 128 include a horizontal shield 802 with a vertical shield 610 on an end of the horizontal shield 802. In the embodiment 800, the ferrite structure 702 and conductors 604 of the windings 602 are separated from the vertical shields 610. In another embodiment, the vertical shields 610 are adjacent to the ferrite structure 702 and/or conductors 604. For example, the vertical shields 610 may be placed within sides of a vehicle 140 to minimize stray electromagnetic field beyond the vehicle 140 where people may be standing.

A width (measured from the horizontal shield 802 in a direction transverse to the horizontal shield 802), a thickness, and a material of the vertical shield 610 may be chosen along with a position of the vertical shields to maintain an electromagnetic field strength below a specified limit where people are located, such as a governmental standard. In addition, the thickness, size, and material of the horizontal shield 802 may be chosen to reduce an electromagnetic field strength below a specified limit where people are located. In one embodiment, the vertical shield 610 and/or the horizontal shield 802 include a metallic material, such as aluminum. One of skill in the art will recognize other metallic materials suitable for the vertical shield 610 and/or the horizontal shield 802.

In one embodiment, the primary pad 126 and secondary pad 128 each include a ferrite chimney 606. The ferrite chimneys 606 may reduce a distance between the pads 126, 128 and may provide a convenient magnetic pathway 804 between the pads 126, 128. The ferrite chimneys 606, in one embodiment, extend at least to a distance away from the ferrite structure 702 that is at least level with the conductors 604 of the windings 602 and may extend beyond the conductors 604, as depicted in FIG. 8. In another embodiment, the ferrite chimneys 606 extend at least to a distance away from the ferrite structure 702 that is at least twice a thickness of the horizontal shield 802. In one embodiment, the ferrite chimneys 606 surround a center section, which may include capacitors (e.g. $Cs2a$, $Cs3a$, $Cs2b$, $Cs3b$). Note that the capacitors $Cs2a$, $Cs3a$, $Cs2b$, $Cs3b$ are not shown for clarity, but are intended to be included in the embodiment 800. In another embodiment, the center section is empty.

The ferrite chimneys 606 are discussed in more detail in U.S. Patent Application No. 62/554,950 filed Sep. 9, 2017 for Patrice Lethellier, which is incorporated herein by reference for all purposes. In another embodiment, the primary pad 126 includes a pyramid-shaped ferrite chimney (not shown) that is located at a center of each winding, which allows for a degree of misalignment between the pads 126, 128 while maintaining an adequate degree of magnetic coupling. Pyramid-shaped ferrite chimneys are discussed in more detail in U.S. Patent Application No. 62/554,960 filed Sep. 9, 2017 for Patrice Lethellier, which is incorporated herein by reference for all purposes.

North ("N") and south ("S") poles are depicted as well as a magnetic pathway 804 where electromagnetic flux may travel from north to south poles and then through the ferrite structure 702. The ferrite structure 702 extending between windings provides a low impedance magnetic pathway from one winding (e.g. $602a$) to another winding (e.g. $602b$, $602d$), which facilitates efficient transfer of energy wirelessly between the pads 126, 128. In addition, each winding $602a$-$d$ may be connected to a different resonant converter 118 to parallel the resonant converters 118 to increase the wireless power transfer capability of the pads 126, 128. The magnetic pathway formed in the ferrite structure 702 and the ferrite chimneys 606, as depicted in FIGS. 7 and 8, help to direct the electromagnetic field generated in the windings 602 into the ferrite structure 702 and to minimize stray electromagnetic field external to the ferrite structure 702, ferrite chimneys 606 and area directly between the ferrite chimneys 606, i.e. in locations where the electromagnetic field is not wanted. In addition, the horizontal shields 802 and the vertical shields 610 help to shunt stray electromagnetic fields to minimize electromagnetic field strength beyond the horizontal shields 802 and the vertical shields 610.

Figure 9:
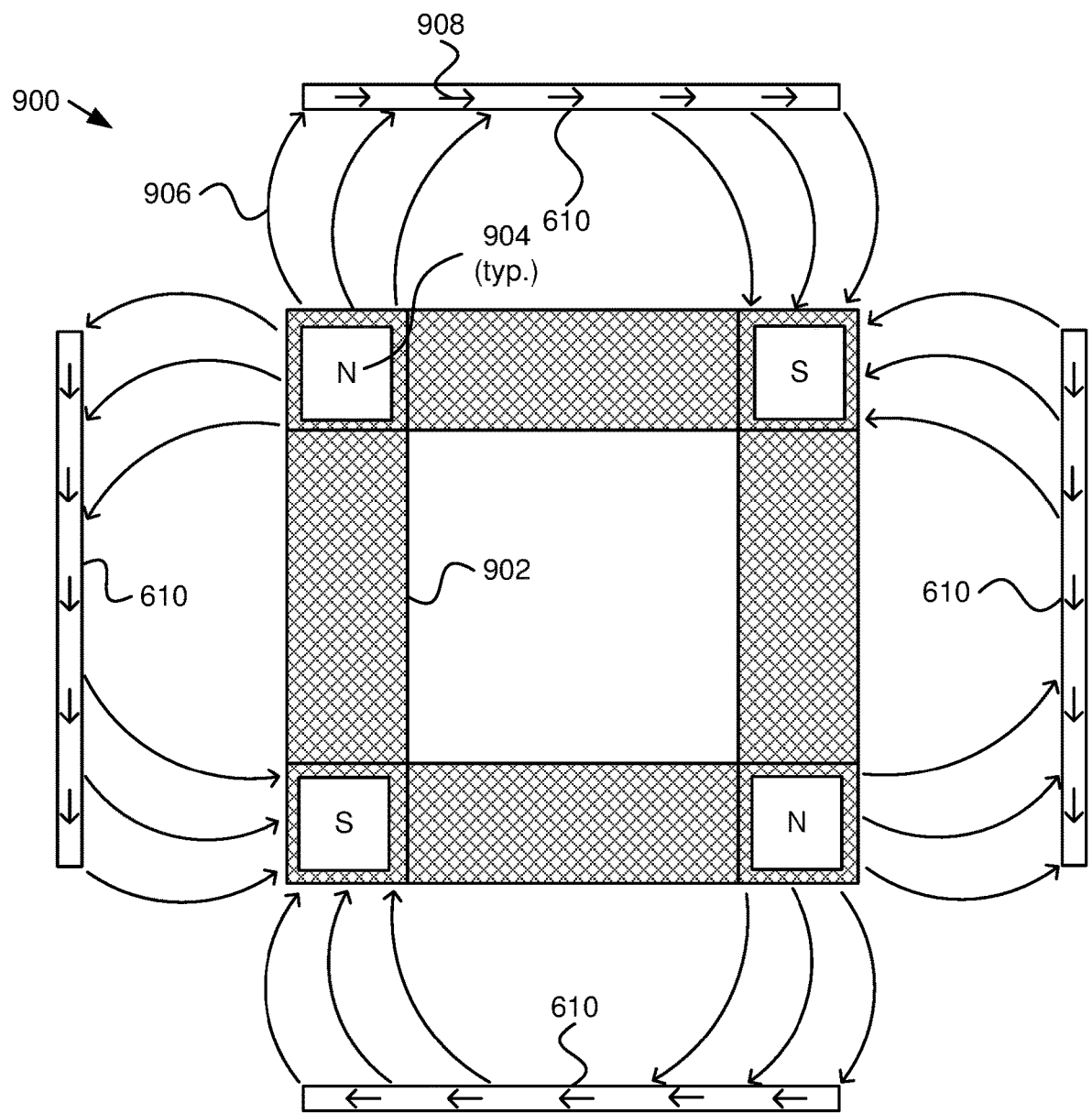
FIG. 9 is a schematic block diagram illustrating one embodiment of a simplified ferrite structure of a four winding WPT pad and vertical shields depicting shunting of a stray electromagnetic field.

FIG. 9 is a schematic block diagram illustrating one embodiment 900 of a simplified ferrite structure 902 of a four winding WPT pad (e.g. 126, 128) and vertical shields 610 depicting shunting of a stray electromagnetic field. The simplified ferrite structure 902 may represent the ferrite structure of the embodiments 600, 800 of FIGS. 7 and 8, but is simply depicted to indicate functionality of the vertical shields 610. The simplified ferrite structure 902 include center sections 904 with north ("N") and south ("S") poles as indicated. Stray electromagnetic field lines 906 extend beyond the simplified ferrite structure 902, but are shunted by the vertical shields 610, as depicted by the field lines 908 in the vertical shields 610. The shunting of the stray electromagnetic field 906 reduces electromagnetic field strength beyond the vertical shields 610.

Figure 10:
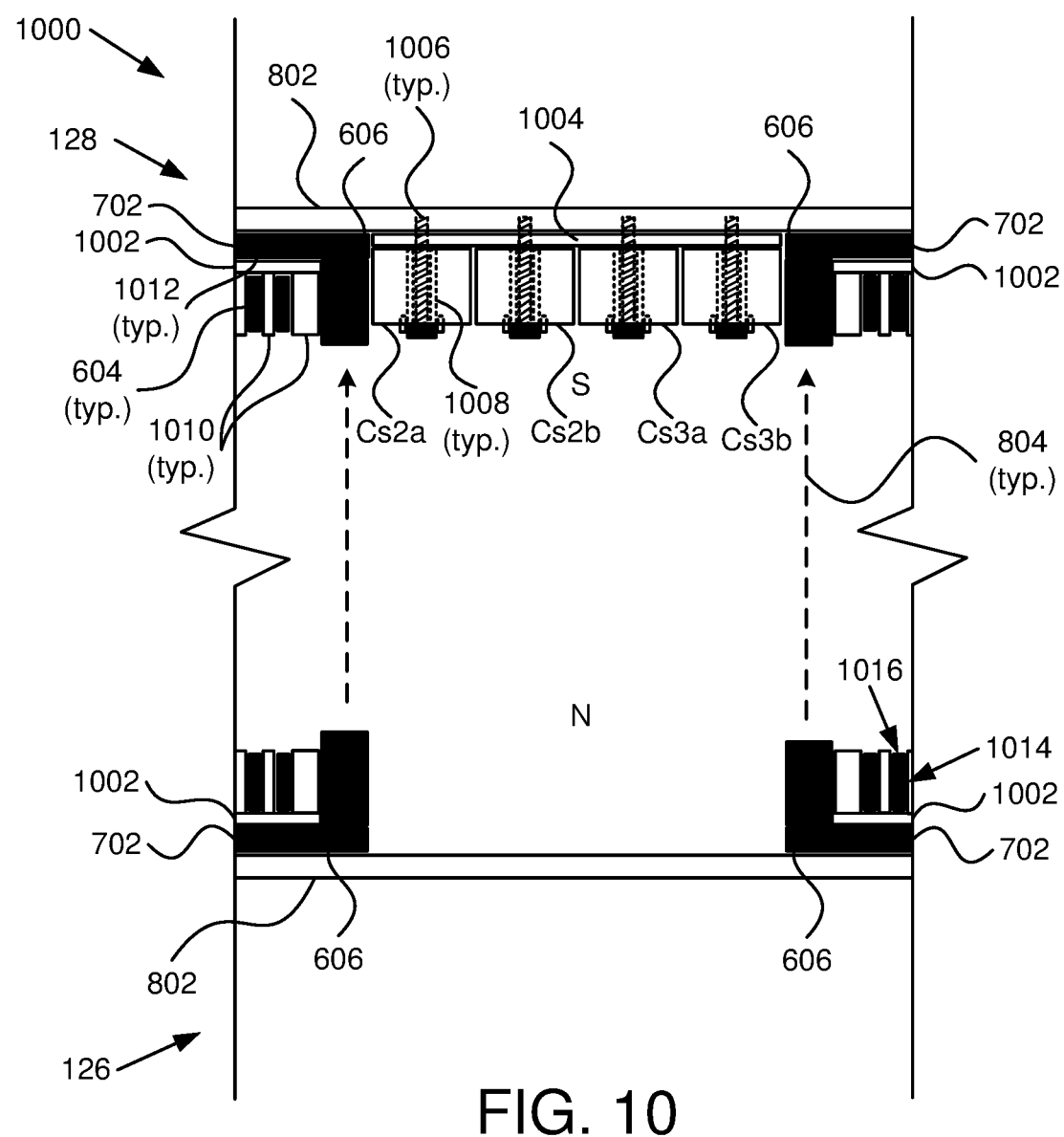
FIG. 10 is a schematic block diagram illustrating one embodiment of a center section of a winding with capacitors.

FIG. 10 is a schematic block diagram illustrating one embodiment 1000 of a center section of a winding 602 with capacitors (e.g. $Cs2a$). The embodiment 1000, in one example, is an enlargement of the center section of the embodiment 800 of FIG. 8. In the embodiment 1000, a primary pad 126 and secondary pad 128 are depicted and the horizontal shield 802, the ferrite structure 702 with a horizontal surface 1012, the conductors 604 of the windings 602, the ferrite chimneys 606 and the capacitors $Cs2a$, $Cs2b$, $Cs3a$, $Cs3b$ (collectively "Cs") are substantially similar to those described above in relation to the embodiments 600, 800 of FIGS. 6-8.

The capacitors Cs are depicted in the center section of the secondary pad 128 and not in the center section of the primary pad 126. In some embodiments, capacitors Cs of the primary pad 126 may be located separate from the primary pad 126, for example, to avoid replacement of the primary pad 126 when a capacitor Cs is replaced. In other embodiments, the primary pad 126 may include capacitors (e.g. C1, C2 in the tuning section 204 without capacitors Cs included with the primary pad 126. In other embodiments, the primary pad 126 includes one or more capacitors Cs in the center section.

In one embodiment, an insulator 1002 that is thermally conductive is positioned between the ferrite structure 702 and the conductors 604. The insulator 1002 provides electrical insulation between the conductors 604 and the ferrite structure 702. The insulator 1002 is thermally conductive to transmit heat from the conductors 604 to the ferrite structure 702, which transmits heat to the horizontal shield 802. The insulator 1002, in one embodiment, is FR-4 compliant.

In another embodiment, the capacitors Cs are separated from the horizontal shield 802 with a spacer 1004. In one embodiment, the spacer 1004 is thermally conductive. In another embodiment, the spacer 1004 provides electrical insulation between the capacitors Cs and the horizontal shield 802. In one example, the spacer 1004 includes aluminum nitride, which has a high thermal conductance while including a high resistivity, which provides an insulating property. In other embodiments, the spacer 1004 is made of beryllium oxide or boron nitride. In one embodiment, the spacer 1004 has a higher thermal conductivity than the insulator 1002. Typically, aluminum nitride or other ceramics provide a higher thermal conductance than FR-4. However, the insulator 1002 is typically spread over a larger area and FR-4 is more forgiving than ceramics, such as aluminum nitride. Where thermal requirements increase for the conductors 604, aluminum nitride or another high thermal conductivity insulator may be used.

The capacitors Cs, in one embodiment are secured to the horizontal shield 802 with a fastener 1006, such as a bolt, screw, rivet, etc. In one embodiment, the fastener 1006 is separated from the capacitor Cs with an insulating material 1008, which electrically isolates the capacitor Cs from the fastener 1006. A bus or other conductor (not shown) may connect to the capacitors Cs to a winding 602 or other component in the secondary pad 128.

In one embodiment, the conductors 604 and ferrite chimneys 606 are separated by winding guides 1010. In one embodiment, the winding guides 1010 are part of the winding structure 612. For example, the winding structure 612 may have channels and/or posts that maintain spacing between conductors 604, turns of a conductor 604, the ferrite chimneys 606, etc. In another embodiment, the winding guides 1010 are an insulating material that provides electrical insulation for conductors 604, ferrite chimneys 606, etc. sufficient for an expected voltage. For example, the winding guides 1010 may be rated for a voltage much higher than an expected voltage by a certain amount or ratio (i.e. 2 times). In some embodiments, the winding guides 1010 and/or winding structure 612 are nylon or an equivalent material. Nylon may be useful in that nylon may be formed in a particular shape and typically provide an adequate amount of electrical insulation for a desired thickness.

In one embodiment, a WPT pad 600 includes a ferrite structure 702 with a horizontal surface 1012 with a winding 602 with a conductor 604 where the conductor 604 includes a long side 1014 and a narrow side 1016. The long side 1014 is oriented transverse to the horizontal surface 1012 of the ferrite structure 702 and the narrow side 1016 is planar with the horizontal surface 1012. The conductor 604 of the winding 602 is wound in a spiral-type configuration. For example, the conductor 604 may be in a rectangular shape with two parallel long sides 1014 and two parallel narrow sides 1016, as depicted in FIG. 10. Having a rectangular shape with the conductor 604 oriented as depicted may facilitate bending of the conductor 604 in a direction around the center section 704 of the winding 602 with a smaller radius than conductors 604 of other shapes, such as a round conductor, a square conductor, etc.

In another embodiment, the conductor 604 is made of litz wire or the like. The litz wire conductor 604 may include strands and/or sub-strands of small diameter conductors so that the conductor 604 is made up of a lot of conductors with radii much, much smaller than dimensions of the conductor 604. One of skill in the art will recognize properties of a litz wire. The litz wire conductor 604 may also provide additional pliability to reduce a bending radius around the center section 704 of the winding 602. In addition, having the narrow sides 1016 facing the ferrite structure 702 also contributes to a more compact winding 602 because the conductors 604 may be packed together closer than round conductors, square conductors, etc.

In one embodiment, the WPT pad 126, 128 includes a winding structure 612 with one or more winding guides 1010 where the winding guides 1010 maintain the conductor 604 in a winding pattern. (A horizontal portion of the winding structure 612 is not depicted for clarity.) For example, the winding guides 1010 may maintain spacing between each turn of the winding 602. In another example, the winding structure 612 includes posts and/or channels that maintain the conductor 604 in a winding pattern. The winding structure 612 is described in more detail with regard to FIG. 11.

Figure 11:
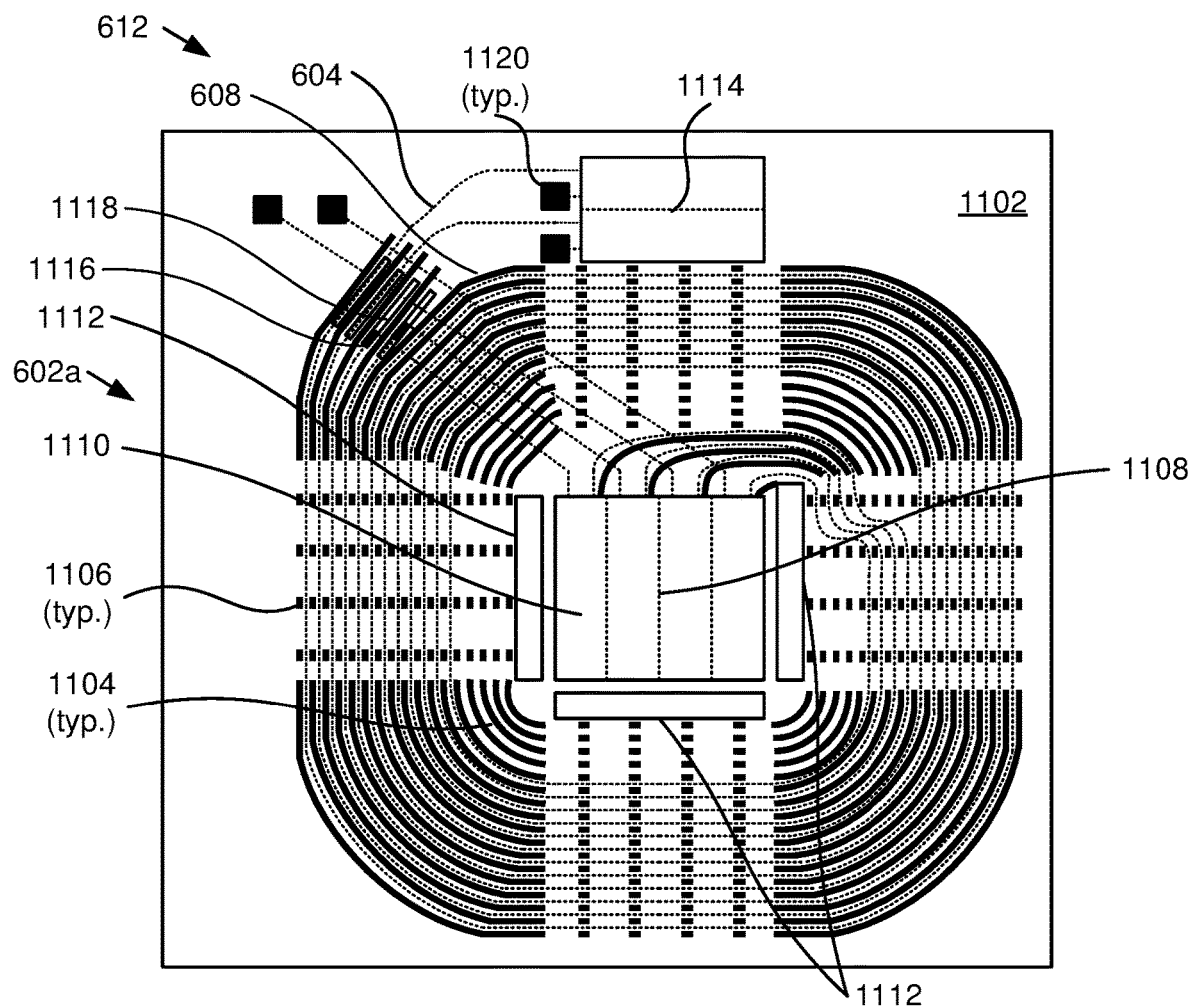
FIG. 11 is a schematic block diagram illustrating one embodiment of a winding structure that guides conductors within a winding.

FIG. 11 is a schematic block diagram illustrating one embodiment of a winding structure 612 that guides conductors 604 within a winding 602. The winding structure 612, in one embodiment, provides a framework for creating a winding 602 where the winding 602 may have various radii, various number of turns, etc. In one embodiment, the winding structure 612 may be used to test various spiral-type winding patterns of one or more conductors 604 to adjust inductance, number of turns, connection to components, such as capacitors (e.g. Cs), connectors, etc.

In one embodiment, the winding structure 612 includes a base 1102 that includes an insulating material. For example, the base 1102 may have a planar shape and may have channels 1104 and posts 1106 configured to maintain one or more conductors 604 of a winding 602 in a particular shape and spacing. The winding structure 612 depicted in FIG. 11 includes channels 1104 and posts 1106 that may be used to produce a winding 602 in a spiral-type pattern with curved sections and straight sections. For convenience, the channels 1104 are depicted as solid lines where conductors 604 (dashed lines) are between the solid lines in the channels 1104. The solid lines may represent tops of winding guides 1010 depicted in FIG. 10 where the channels 1104 are between the winding guides 1010, depicted as the solid lines. The channels 1104 are distributed around a center point 1108 of the winding 602 at various distances from the center point 1108 to provide for various diameters of a spiral-type pattern.

The channels 1104, in one embodiment, are cut into the base 1102. Material around the posts 1106 expose the posts 1106, which are depicted as short, solid lines. Conductors 604 can follow a channel 1104 and traverse in a straight line through the posts 1106, for example as depicted on the bottom, left and top of the winding 602, and can transition through gaps around the posts 1106 to a different channel 1104 or to the center section 1110, for example to capacitors or connectors. The gaps around the posts 1106 and channels 1104 are arranged to provide pathways to a center section 1110.

The base 1102 includes, in one embodiment, recesses for various components. In one embodiment, the base 1102 includes capacitor openings, such as a capacitor opening for capacitors Cs in the center section 1110 or a capacitor opening 1114 around the perimeter of the winding 602. The base may also include ferrite openings 1112 for the ferrite chimneys 606. For example, the ferrite openings 1112 for the ferrite chimneys 606 may be positioned around the center section 1110 and may be sized for the ferrite chimneys 606.

In one embodiment, the winding structure 612 includes one or more terminal slots 1118 and a terminal 1116 within a terminal slot 1118. One or more conductors 604 of the winding 602 each terminate on a terminal 1116 within a terminal slot 1118. The terminal slots 1118 have a length longer than a terminal 1116 and the terminal 1116 of a terminal slot 1118 is movable within the terminal slot 1118 of the terminal 1116 along the length of the terminal slot 1118. The terminal 1116 may allow for a transition between a channel 1104 and a portion of a conductor 604 traversing the channels 1104 to a capacitor Cs or other component in the center section 1110. The terminal slot 1118 allows for the terminal 1116 to be easily moved to another position. The winding structure 612 may also include one or more fasteners 1120 where the conductor(s) 604 terminate on the fasteners 1120. The fasteners 1120 allow for external connection of the winding 602.

In one embodiment, the winding structure 612 includes a position maintaining material (not shown) placed around components within the winding structure 612. The position maintaining material is placed around the components once a configuration of the components is set to maintain the conductors 604, capacitors Cs, etc. In one embodiment, the position maintaining material is an epoxy resin. The winding structure 612 is advantageous to provide numerous winding configurations and component configurations. For example, a single winding structure 612 may be used for several winding designs. Once a winding design is set and the conductors 604 and components are in place, the position maintaining material can fill in gaps of the winding structure 612.

Figure 12:
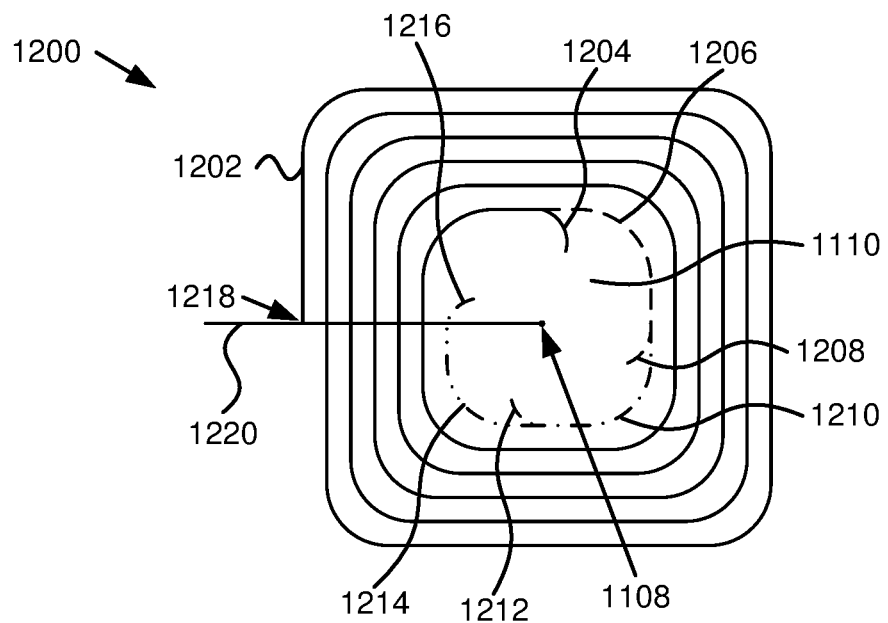
FIG. 12 is a schematic block diagram illustrating one embodiment of a fractional winding.

FIG. 12 is a schematic block diagram illustrating one embodiment of a fractional winding 1200. The fractional winding 1200 includes a conductor 1202 that is capable of terminating at various location in a center section 1110. For example, the conductor 1202 may terminate at the top of the center section 1110 with an end 1204 extending to the center section 1110, providing 5¼ turns. In another embodiment, the conductor 1202 may extend (see dashed conductor 1206 and end 1208) to the right side of the center section 1110 providing 5½ turns. In another embodiment, the conductor 1202 may extend (see dashed conductor with one dot 1210 and end 1212) to the bottom of the center section 1110 providing 5¾ turns. In another embodiment, the conductor 1202 may extend (see dashed conductor and two dots 1214 and end 1216) to the left side of the center section 1110 providing 6 turns. While FIG. 12 depicts a single conductor 1202, the fractional winding 1200 may include additional conductors 1202 wound in parallel, as depicted in FIGS. 5 and 6. Each conductor 1202, in one embodiment, has a different starting point 1218.

The fractional winding 1200 may be used in a WPT pad with a ferrite structure 702 with a horizontal surface 1012. A method for constructing a fractional winding 1200 for wireless power transfer includes providing the ferrite structure 702 with a horizontal surface 1012 and winding a conductor 1202 in a planar arrangement in a spiral-type pattern about a center point 1108. The conductor 1202 is arranged to be adjacent to the horizontal surface 1012 of the ferrite structure 702. The conductor 1202 includes a starting point 1218. Each turn of the conductor 1202 is adjacent to the horizontal surface 1012 of the ferrite structure 702, and the fractional winding 1200 includes a fractional number of turns where the starting point 1218 is at a different angle from a radial line 1220 extending radially from the center point 1108 than angle of an ending point (e.g. 1204, 1208, 1212) of the fractional winding 1200 measured from the radial line 1220.

A length of the conductor 1202 relates to an amount of inductance of the winding and the method, in one embodiment, includes determining a target amount of winding inductance and selecting the fractional number of turns based on the target amount of inductance for the fractional winding 1200. For example, the target inductance may be selected to achieve a desired amount of gain, a resonant frequency, to optimize power transfer, etc. The target inductance, in some embodiments, includes selecting an inductance value that helps to minimize other components while achieving resonance. One of skill in the art will recognize other ways to choose a target inductance.

In one embodiment, the inductance of the fractional winding 1200 is related to a diameter of the spiral-type pattern of the fractional winding 1200 and the method includes determining a diameter of the spiral-type pattern along with selecting the fractional number of turns based on the target amount of inductance of the fractional winding 1200. For example, the winding structure 612 of FIG. 11 may be used to adjust the diameter of the spiral-type pattern and/or to determine a termination point, resulting in a fractional number of turns.

In another embodiment, the conductor 1202 is wound within a winding structure 612 with one or more of channels 1104 and posts 1106 that maintain the fractional winding 1200 in a particular shape and spacing. The channels 1104 are distributed around the center point 1108 at various distances from the center point 1108 to provide for various diameters of the spiral-type pattern. The winding structure 612 may include a plurality of gaps between the channels 1104 and/or posts 1106 arranged to provide pathways to the center section 1110 of the fractional winding 1200 for a fractional number of turns.

The method, in one embodiment, also includes covering the conductors within the winding structure with a position maintaining material that maintains the fractional winding 1200 in a selected spiral-type pattern with a fractional number of turns, and placing the winding structure 612 with the conductors 1202 adjacent to the ferrite structure 702, where the conductors 1202 are adjacent to the horizontal surface 1012 of the ferrite structure 702.

Figure 13A:
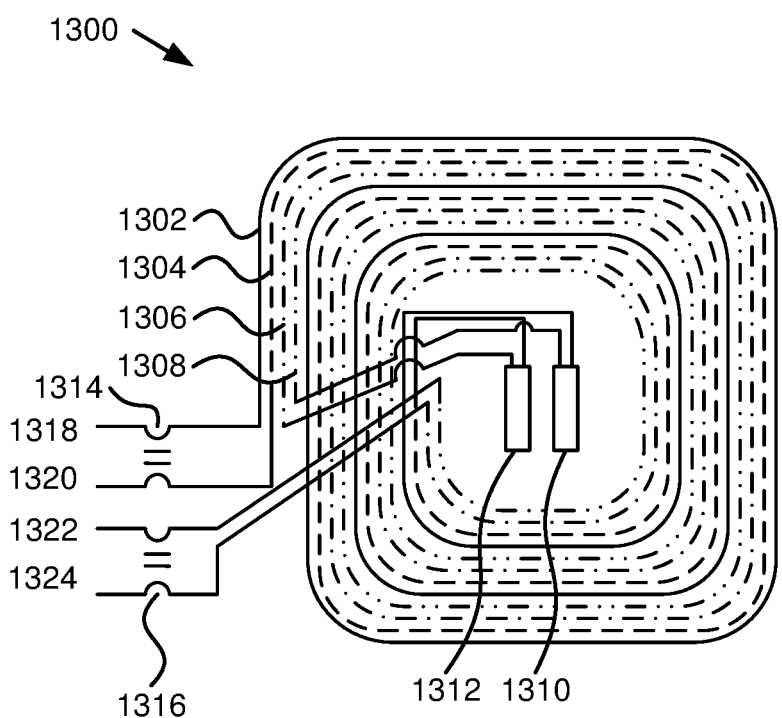
FIG. 13A is a schematic block diagram illustrating one embodiment of a winding with four conductors in parallel connected to compensate for a variation in winding length where the windings include a capacitor between windings.

FIG. 13A is a schematic block diagram illustrating one embodiment of a winding 1300 with four conductors 1302, 1304, 1306, 1308 in parallel connected to compensate for a variation in winding length. Windings in parallel may differ in inductance 5 percent or more, which can dramatically affect power sharing between the windings. Where the conductors 1302, 1304, 1306, 1308 start and terminate at a same angle or (i.e. have a same number of turns, where the "same angle" can be exact or approximate), the first conductor 1302 may be longer than the second conductor 1304, which may be longer than the third conductor 1306, which may be longer than the fourth conductor 1308. The same is true for two windings in parallel where the first winding may be longer than the second winding.

The first and second windings may be arranged to compensate for a difference in length between the first winding and the second winding for portions of the first and second windings wound adjacent to each other. Various methods may be used to compensate for differences in length between conductors, which are discussed with regard to FIGS. 13A-D and 14. As used herein, a starting point of a conductor or a winding is located on an exterior of the winding and an ending point of a conductor or a winding is located in a center section of the winding.

For the winding 1300, connecting the first conductor 1302, i.e. the longest conductor, and the fourth conductor 1308, i.e. the shortest conductor, while connecting the second conductor 1304 and third conductor 1306, which are mid-length conductors, variation in inductance between the paralleled first and fourth conductors 1302, 1308 and the paralleled second and third conductors 1304, 1306 may be minimized.

In the depicted embodiment, a capacitor (i.e. 1310, 1312) is connected at a midpoint of a winding to reduce voltage so the ending point of the first conductor 1302 connects to a terminal of a first capacitor 1310 and a second terminal of the first capacitor 1310 connects to the starting point of the fourth conductor 1308. A conductor jumps out across the conductors 1302-1308 to the starting point of the fourth conductor 1308. At ending points of the third conductor 1306 and at the ending point of fourth conductor 1308, a conductor jumps across the conductors 1302-1308 for an external connection.

Current differences between paralleled conductors (e.g. the first conductor 1302 and the fourth conductor 1308) may also be minimized by including a transformer 1314 with a ferrite core and an equal number of turns. Minimizing an inductance difference between the paralleled conductors (i.e. 1302 and 1308 vs. 1304 and 1308) helps to maintain equal current as well, which is desirable to prevent a conductor (e.g. 1308) from carrying more load than other conductors (e.g. 1302, 1304, 1306) in the winding 1300. In the depicted embodiment, a current sharing transformer 1314 connects conductors 1318, 1320 to the starting points of the first conductor 1302 and the second conductor 1304. In addition, another current sharing transformer 1316 connects conductors 1322, 1324 to the ending points of the third conductor 1306 and the fourth conductor 1308. In some embodiments, the second transformer 1316 is not included. In some embodiments, one or more current sharing transformers 1314, 1316 are located adjacent to the winding 1300. In other embodiments, one or more current sharing transformers 1314, 1316 are located adjacent to the tuning section 204 where a cable is between the tuning section 204 and the winding 1300. Current sharing conductors are discussed in more detail in U.S. Provisional Patent No. 62/567,106, filed Oct. 2, 2017 for Patrice Lethellier, which is incorporated herein by reference for all purposes.

Figure 13B:
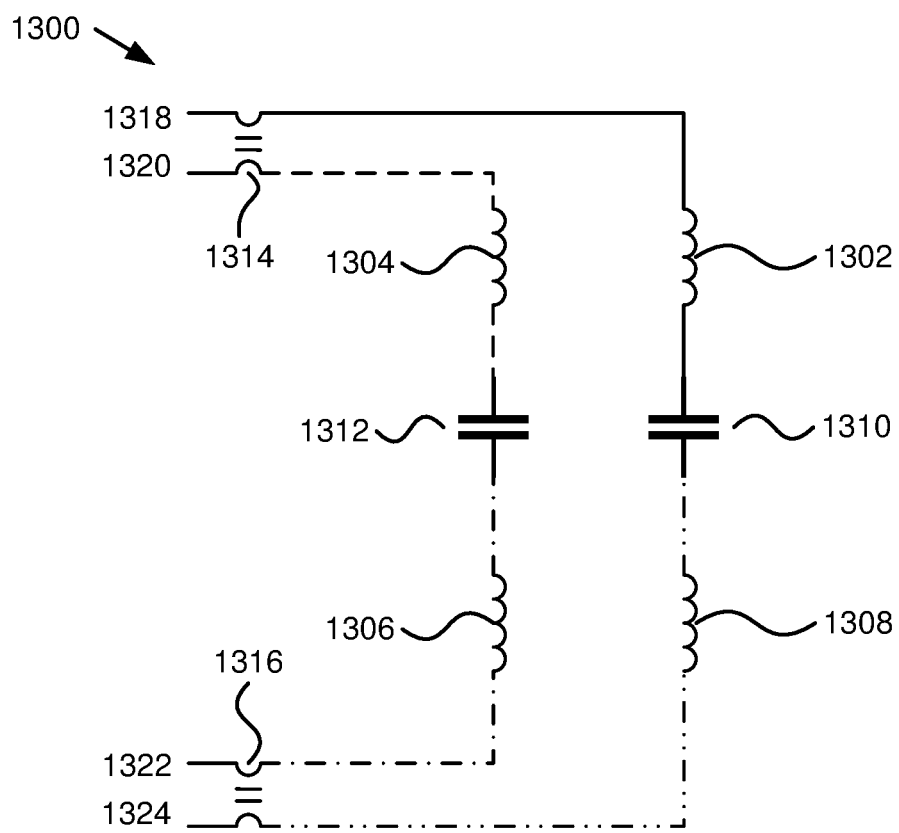
FIG. 13B is a simplified schematic block diagram illustrating the winding of FIG. 13A.

FIG. 13B is a simplified schematic block diagram illustrating the winding 1300 of FIG. 13A. The simplified diagram includes the conductors 1302, 1304, 1306, 1308 depicted as inductors, which represent inductance of the conductors 1302, 1304, 1306, 1308. The inductors 1302, 1304, 1306, 1308 typically differ based on conductor length, geometric variations, etc.

Figure 13C:
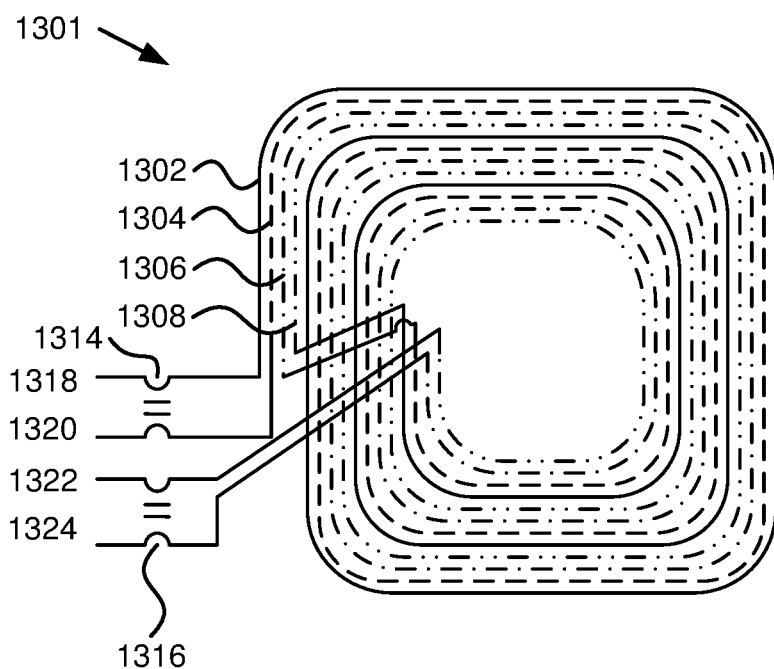
FIG. 13C is a schematic block diagram illustrating one embodiment of a winding with four conductors in parallel connected to compensate for a variation in winding length.
Figure 13D:
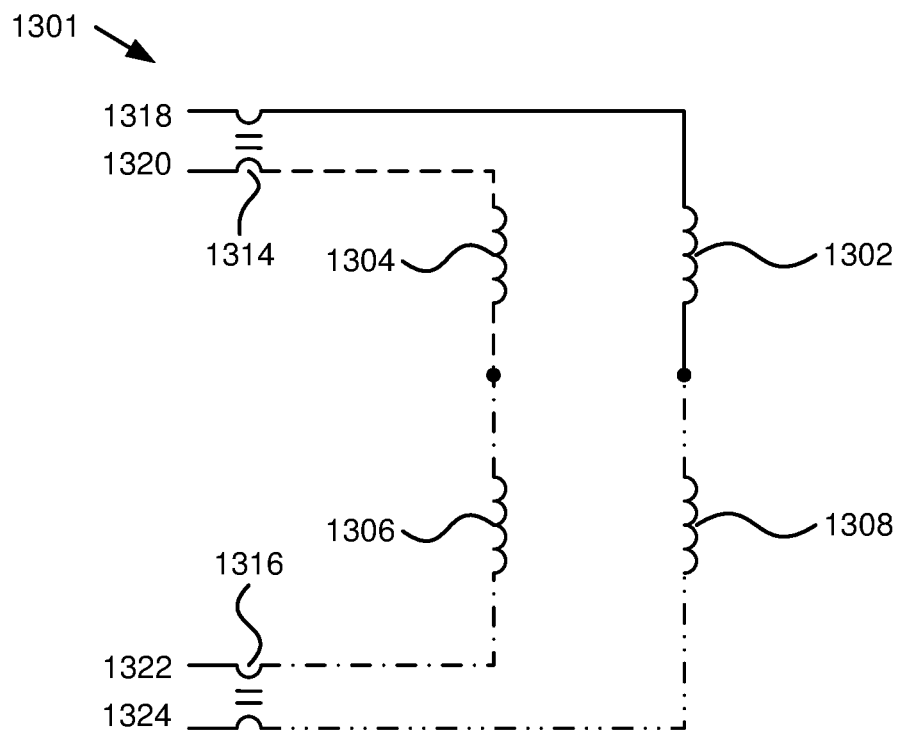
FIG. 13D is a simplified schematic block diagram illustrating the winding of FIG. 13C.

FIG. 13C is a schematic block diagram illustrating one embodiment of a winding 1301 with four conductors 1302-1308 in parallel connected to compensate for a variation in winding length. FIG. 13D is a simplified schematic block diagram illustrating the winding 1301 of FIG. 13C. The winding 1301 in FIGS. 13C and 13D is the same as the winding 1300 in FIGS. 13A and 13B, except without capacitors 1310, 1312. Instead, a conductor connected to the ending point of the first conductor 1302 is connected to the starting point of the fourth conductor 1308 and the ending point of the second conductor 1304 is connected to the starting point of the third conductor 1306.

Figure 14:
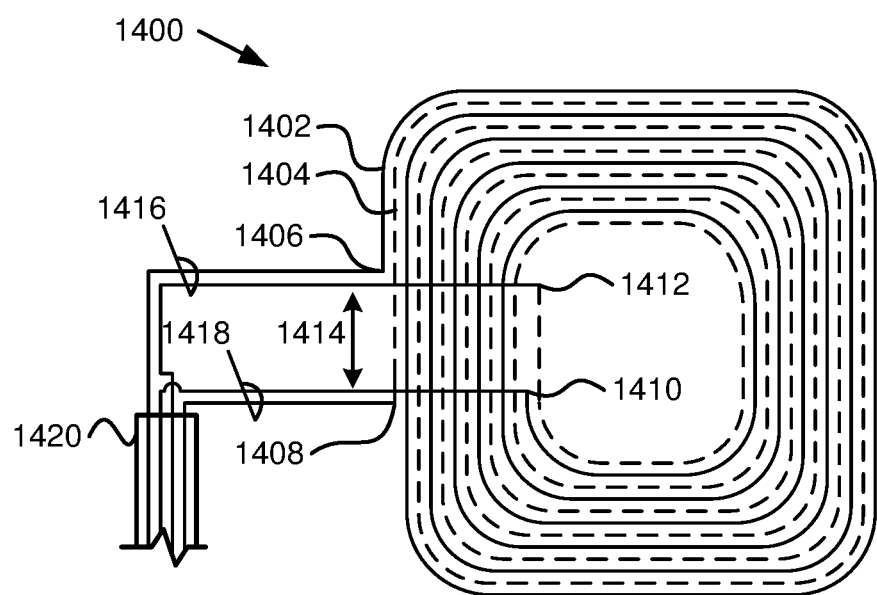
FIG. 14 is a schematic block diagram illustrating one embodiment of a winding with two windings in parallel connected to compensate for a variation in winding length where winding starting and ending points are adjusted to compensate for length variations.

FIG. 14 is a schematic block diagram illustrating one embodiment of a winding 1400 of a WPT pad with two windings 1402 in parallel which are connected to compensate for a variation in winding length where winding starting points 1406, 1408 and ending points 1410, 1412 are adjusted to compensate for length variations. The starting point 1408 of the second winding 1404 is before the starting point 1406 of the first winding 1402. For example, as seen in FIG. 14, in tracing the first and second windings 1402, 1404 radially in a clockwise direction, the starting point 1408 of the second winding 1404 starts first and then moving clockwise radially an additional amount, then the starting point 1406 of the first winding 1402 is located past the starting point 1408 of the second winding 1404.

In addition, an ending point 1412 of the second winding 1404 is after an ending point 1410 of the first winding 1402. Again, tracing the first and second windings 1402, 1404 radially in a clockwise direction, the first winding 1402 ends at the ending point 1410, and continuing clockwise radially, the second winding 1404 ends at its ending point 1412 after the ending point 1410 of the first winding 1402. A spacing 1414 between the starting and ending points 1406-1412 of the windings 1402, 1404 is adjusted to compensate for the length discrepancies between the first and second windings 1402, 1404 caused by the positioning of the first winding 1402 outside the second winding 1404. In one embodiment, the spacing 1414 is adjusted so that a length of the second winding 1404 is equal to a length of the first winding 1402. As used herein, the length of the second winding 1404 being equal to a length of the first winding 1402 includes exactly equal as well as approximately equal. For example, a difference in length between the first winding 1402 and the second winding 1404 may differ one percent or less. In other embodiments, a difference in length between the first winding 1402 and the second winding 1404 may differ 0.5 percent or less. While the winding 1400 is depicted in a square pattern, other patterns may be used and the starting points 1406, 1408 and ending points 1410, 1412 may be adjusted accordingly so the first and second windings 1402, 1404 are equal or approximately equal in length. Where the winding 1400 is in a circular pattern, the spacing 1414 may be measured radially.

In one embodiment, the starting point 1406 of the first winding 1402 is positioned so a conductor connected to the ending point 1412 of the second winding 1404 and traversing the first and second windings 1402, 1404 to the starting point 1406 of the first winding 1404 traverses perpendicular to the first and second windings 1402, 1404 to reach the starting point 1406 of the first winding 1402. A conductor traversing perpendicular, as used herein includes a conductor traversing exactly perpendicular and a conductor traversing approximately perpendicular. For example, approximately perpendicular includes traversing at an angle in a range of 80 degrees to 90 degrees and may include a range of between 88 degrees and 90 degrees.

In another embodiment, the starting point 1408 of the second winding 1404 is positioned so a conductor connected to the ending point 1410 of the first winding 1402 and traversing the first and second windings 1402, 1404 to the starting point 1408 of the second winding 1404 traverses perpendicular to the first and second windings 1402, 1404 to reach the starting point 1408 of the second winding 1404.

In one embodiment, the conductors 1416 from the starting point 1406 the first winding 1402 and the ending point 1412 of the second winding 1404 are run in close proximity to a cable 1420 to minimize electromagnetic radiation. The conductors 1416, in one embodiment, are twisted together. Likewise, in another embodiment, the conductors 1418 from the starting point 1408 the second winding 1404 and the ending point 1410 of the first winding 1402 are run in close proximity to the cable 1420 to minimize electromagnetic radiation. The conductors 1416, 1418 may be arranged in the cable 1420 to minimize electromagnetic radiation as well.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wireless power transfer ("WPT") pad apparatus comprising:
a ferrite structure; and
four windings adjacent to the ferrite structure, wherein a horizontal surface of the ferrite structure is adjacent to each of the four windings, each of the four windings wound in a horizontal pattern that is planar to the horizontal surface,
wherein the four windings are arranged in a two-by-two square pattern in a north-south-north-south polarity arrangement.

2. The WPT pad apparatus of claim 1, wherein for adjacent windings of the four windings, the ferrite structure comprises a magnetic pathway.

3. The WPT pad apparatus of claim 2, wherein a ferrite pathway between adjacent windings of the four windings comprises a thickness and a width to provide a low impedance, unsaturated magnetic pathway for an electromagnetic field generated by the adjacent windings.

4. The WPT pad apparatus of claim 1, wherein the ferrite structure comprises an opening in a center section, wherein the center section is located at a center of the two-by-two square pattern and the center section is external to each of the four windings.

5. The WPT pad apparatus of claim 1, further comprising a vertical shield external to the ferrite structure positioned to shunt an electromagnetic field radiating in a direction horizontal with the horizontal surface of the ferrite structure.

6. The WPT pad apparatus of claim 5, wherein the vertical shield comprises a metallic structure oriented transverse to the horizontal surface of the ferrite structure.

7. The WPT pad apparatus of claim 5, wherein the vertical shield comprises a width, the width measured in a direction transverse to the horizontal surface of the ferrite structure, wherein the width comprises at least a thickness of an edge of the ferrite structure and a thickness of the winding.

8. The WPT pad apparatus of claim 5, wherein the vertical shield comprises an opening at each corner of the ferrite structure.

9. The WPT pad apparatus of claim 1, wherein the horizontal surface comprises a first horizontal surface and further comprising a horizontal shield positioned on a second horizontal surface of the ferrite structure, the second horizontal surface distal to the first horizontal surface and planar with the first horizontal surface.

10. The WPT pad apparatus of claim 9, wherein the horizontal shield comprises metallic plate and the horizontal shield reduces a strength of an electromagnetic field generated by the four windings and radiating through the horizontal shield to below a specified limit.

11. The WPT pad apparatus of claim 9, wherein the ferrite structure is thermally coupled to the horizontal shield, wherein heat generated in each of the four windings and in the ferrite structure is transmitted to the horizontal shield.

12. The WPT pad apparatus of claim 9, further comprising a vertical shield external to the ferrite structure, the vertical shield coupled to the horizontal shield and extending in a direction transverse to the horizontal shield in a direction of the ferrite structure and the four windings.

13. The WPT pad apparatus of claim 1, wherein each of the four windings comprises a spiral pattern starting at an edge of a winding center section and expanding away from the center section, the center section comprising an area without conductors at a center of a winding.

14. The WPT pad apparatus of claim 13, wherein each winding of the four windings comprises two or more winding sections wound in parallel and each winding section is connected to a capacitor located at the center section of the winding.

15. The WPT pad apparatus of claim 13, wherein the center section of each winding comprises a ferrite chimney coupled to the horizontal surface of the ferrite structure and extending in a direction transverse to the horizontal surface at least a a thickness of the winding associated with the center section.

16. The WPT pad apparatus of claim 1, wherein each of the four windings comprises a conductor, each conductor comprises multiple strands, the strands electrically isolated from each other, the conductor comprising a wide side and a narrow side, wherein the wide side of the conductor is oriented transverse to the horizontal surface.

17. The WPT pad apparatus of claim 16, wherein the conductor is a litz wire.

18. A wireless power transfer ("WPT") pad apparatus comprising:
  a ferrite structure; and
  four windings adjacent to the ferrite structure, wherein a horizontal surface of the ferrite structure is adjacent to each of the four windings, each of the four windings wound in a horizontal pattern that is planar to the horizontal surface,
  wherein the four windings are arranged in a two-by-two square pattern in a north-south-north-south polarity arrangement,
  wherein for adjacent windings of the four windings, the ferrite structure comprises a magnetic pathway, and
  wherein a ferrite pathway between adjacent windings of the four windings comprises a thickness and a width to provide a low impedance, unsaturated magnetic pathway for an electromagnetic field generated by the adjacent windings, and
  wherein the ferrite structure comprises an opening in a center section, wherein the center section is located at a center of the two-by-two square pattern and the center section is external to each of the four windings.

19. The WPT pad apparatus of claim 18, further comprising one or more of:
  a vertical shield external to the ferrite structure positioned to shunt an electromagnetic field radiating in a direction horizontal with the horizontal surface of the ferrite structure; and
  a ferrite chimney coupled to the horizontal surface of the ferrite structure in the center section of each winding and extending in a direction transverse to the horizontal surface at least a thickness of the winding associated with the center section.

20. A wireless power transfer ("WPT") system comprising:
  a first stage comprising one or more of a resonant converter and an alternating current ("AC") to direct current ("DC") converter, the first stage configured to wirelessly transmit power to a second stage on a vehicle;
  a WPT pad apparatus that receives power from the first stage and transmits power wirelessly to a secondary pad of the second stage, the WPT pad apparatus comprising:
    a ferrite structure; and
    four windings adjacent to the ferrite structure, wherein a horizontal surface of the ferrite structure is adjacent to each of the four windings, each of the four windings wound in a horizontal pattern that is planar to the horizontal surface,
    wherein the four windings are arranged in a two-by-two square pattern in a north-south-north-south polarity arrangement.

* * * * *